(12) United States Patent
Kessler

(10) Patent No.: US 8,708,782 B2
(45) Date of Patent: Apr. 29, 2014

(54) ROBOTIC DEVICE FOR INSERTING OR REMOVING ROD-LIKE ELEMENTS

(75) Inventor: Günter Kessler, Frankfurt am Main (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 457 days.

(21) Appl. No.: 13/101,117

(22) Filed: May 4, 2011

(65) Prior Publication Data
US 2011/0274529 A1    Nov. 10, 2011

(30) Foreign Application Priority Data
May 4, 2010    (EP) .................................... 10004707

(51) Int. Cl.
A22C 11/00    (2006.01)

(52) U.S. Cl.
USPC .......................................................... 452/51

(58) Field of Classification Search
USPC .................. 452/30–32, 35–37, 46–48, 51
See application file for complete search history.

(56) References Cited

U.S. PATENT DOCUMENTS

| | | | |
|---|---|---|---|
| 5,238,353 A | 8/1993 | Kollross et al. | |
| 6,409,460 B1 | 6/2002 | Leining | |
| 6,786,321 B2 * | 9/2004 | Borkiewicz et al. | 198/419.3 |
| 6,869,353 B2 * | 3/2005 | Kasai | 452/186 |
| 7,249,997 B2 * | 7/2007 | Kasai | 452/51 |
| 7,354,338 B2 | 4/2008 | Nakamura et al. | |
| 7,464,806 B2 * | 12/2008 | Borkiewicz et al. | 198/465.4 |
| 7,588,485 B1 | 9/2009 | Nakamura et al. | |
| 7,614,942 B2 * | 11/2009 | Liermann et al. | 452/186 |
| 7,735,630 B2 * | 6/2010 | Borkiewicz et al. | 198/465.4 |
| 8,151,973 B2 * | 4/2012 | Borkiewicz et al. | 198/465.4 |
| 8,366,522 B2 * | 2/2013 | Wally et al. | 452/32 |
| 8,475,239 B2 * | 7/2013 | Meyrahn et al. | 452/51 |
| 2005/0239386 A1 | 10/2005 | Nakamura et al. | |

FOREIGN PATENT DOCUMENTS

| | | |
|---|---|---|
| DE | 100 46 417 C1 | 3/2002 |
| DE | 102 52 876 A1 | 6/2004 |
| EP | 1 625 793 A1 | 2/2006 |
| EP | 1 994 829 A1 | 11/2008 |
| FR | 2 381 472 A1 | 9/1978 |

OTHER PUBLICATIONS

FR 2 381 472 A1—English abstract and machine translation obtained from Espacenet (http://worldwide.espacenet.com) accessed on Apr. 23, 2012, 10 pages.
DE 100 46 417 C1—English abstract and machine translation obtained from Espacenet (http://worldwide.espacenet.com) accessed on Apr. 20, 2012, 6 pages.
DE 102 52 876 A1—English abstract and machine translation obtained from Espacenet (http://worldwide.espacenet.com) accessed on Apr. 23, 2012, 7 pages.
EP 1 625 793 A1—English abstract and machine translation obtained from Espacenet (http://worldwide.espacenet.com) accessed on Apr. 23, 2012, 8 pages.
EP 1 994 829 A1—English abstract and machine translation obtained from Espacenet (http://worldwide.espacenet.com) accessed on Apr. 20, 2012, 13 pages.

* cited by examiner

Primary Examiner — Richard Price, Jr.
(74) Attorney, Agent, or Firm — Hahn Loeser & Parks LLP

(57) ABSTRACT

The invention relates to a handling system for transporting, removing or inserting rod-like elements. Furthermore, the invention relates to a method for transporting, removing or inserting rod-like elements.

14 Claims, 15 Drawing Sheets

ROBOTIC DEVICE FOR INSERTING OR REMOVING ROD-LIKE ELEMENTS

This application claims priority to, and the benefit of, European Patent Application No. 10 004 707.5-1260 filed May 4, 2010, which is hereby incorporated by reference.

BACKGROUND OF THE INVENTION

The present invention relates to a method for controlling a robotic device and a system therefore.

In particular, the present invention relates to a method for controlling a robotic device for inserting or removing rod-like elements, like smoking bars, into or from a storage frame, the rod-like elements serving for storing sausage-like products, like sausages, each having a sausage-shaped body and a loop on one end of the body for a pendulously storage of the products. The method comprises the steps of providing a movable storage frame for temporary storing rod-like elements, moving the storage frame into the operating range of the robotic device, picking up by the robotic device a rod-like element on which at least one sausage-like product is hung up, and inserting or removing the rod-like element into or from the storage frame by the robotic device. Furthermore, the invention relates to a system, for controlling a robotic device for inserting or removing rod-like elements, like smoking bars, into or from a storage frame, the rod-like elements serving for storing sausage-like products, like sausages, each having a sausage-shaped body and a loop on one end of the body for a pendulously storage of the products. The system comprises at least one movable storage frame for temporary storing rod-like elements, a robotic device for inserting or removing rod-like elements into or from the storage frame and a control unit for controlling the movement of the robotic device.

In an already known production line for producing sausage-like products, like sausages, a filling tube is provided for feeding a packing material or tubular casing, respectively, with, for example, sausage meat wherein the tubular casing is closed at one end facing in the filling direction by a first clip. After the filling operation is concluded, the tube-like casing is finally closed by a second clip. If the sausage is later to be hung up, for example for the purposes of smoking or storage, a suspension loop is fed thereto in such a way that, when the first or second clip is attached, it is embraced by the respective clip and is thus secured to the sausage. The term loops in accordance with this invention is used to denote all at least partially flexible means, by way of which articles can be hung up.

After the filling process, the sausages can be subjected to further processing, for example in a smoking chamber. For that purpose, the sausages have to be transported to the end of the conveyor and there taken over by an automatic hanging line, in which the sausages are hung up on a rod-like element, such as a smoking rod, at their loops one after another in such a way that, as far as possible, they do not touch each other. Afterwards, the smoking rods are transported to a further storage frame which has rollers for transporting the smoking rods into a smoking chamber. A robotic device is provided for removing smoking rods from the storage frame and/or inserting smoking rods into the storage frame.

A robotic device being part of an automatic sausage production line for inserting or removing rod-like elements into or from a storage frame is known from EP patent application 1 994 829.

In the production of sausage-like products, there is a great variety of machines being components of the respective production line. Said machines may vary in size, in rate of production or in size of products. Thus, they also may vary in the kind of used rod-like elements, on which the sausage-like products are to be stored and in the kind of storage frames, to which the rod-like elements are to be fed or from which they have to be removed. Even if identical rod-like elements are used, depending on the kind of sausage-like products and their further treatment, like smoking or boiling for sausages as sausage-like products, the rod-like elements together with the sausage-like products hanging thereon, have to be placed at specific positions inside a storage frame. Moreover, there is also a great variety of storage frames used. Said storage frames may be standardized, but they may also be individual produced.

Typical storage frames used in the manufacturing process for sausages have a length of about 0.80 m to 1 m, a depth of about 1.00 m and a height of 1.20 m. The tray rails or shelf rails, respectively, which are arranged at opposite side walls of the storage frame and on which the rod-like elements are to be placed, may be formed by horizontally arranged profiles of a U-formed or square cross-section. The tray rails have a predefined vertical distance in height to each other, which is normally about 0.50 m, and also a predefined height to the bottom level. The storage frame further comprises wheels or rollers, respectively, for moving the storage frame automatically or by hand.

According to the manufacturer, the storage frame may vary in size regarding the above-mentioned dimensions and/or in the diameter of the wheels used. Moreover, in use, storage frames may be damaged, individually adapted or repaired. Thus, the rails on which the rod-like elements are to be placed, may be modified and their position may be changed.

While inserting a rod-like element together with the sausage-like products hanging thereon into a storage frame, said rod-like element may butt against the storage frame since, for example, the size of said storage frame has been modified due to adaption, repair or damage. As a result thereof, the sausage-like products may fall off the smoking rod or may be destroyed.

To avoid the above described disadvantages, only one specific kind of storage frame is usable in conjunction with the robotic device. Moreover, to restore the exact dimensions of said storage frame by e.g. repairing, a damaged storage frame is very expensive.

BRIEF SUMMARY OF THE INVENTION

Therefore, it is an object of the invention to provide a method and a system for controlling a robotic device for inserting and removing rod-like elements into or from a storage frame, with which the above mentioned drawbacks can be overcome and with which a correct insertion and removal of rod-like elements into or from storage frame free of damages is assured.

In the present invention, the method for controlling a robotic device for inserting or removing rod-like elements, like smoking bars, into or from a storage frame, the rod-like elements serving for storing sausage-like products, like sausages, each of which has a sausage-shaped body and a loop on one end of the body for a pendulously storage of the products, comprising the steps of providing a movable storage frame for temporary storing rod-like elements, moving the storage frame into the operating range of the robotic device, picking up by the robotic device a rod-like element on which at least one sausage-like product is hung up, and inserting or removing the rod-like element into or from the storage frame by the robotic device.

According to an embodiment of the invention, a storage frame with at least a machine readable label including information as to the storage frame is provided and said information are readout from said label, which is attached to the storage device, at least before the storage frame is moved into the operating range of the robotic device. Said information are sent to a control unit of the robotic device for controlling the movement of the robotic device while inserting or removing rod-like elements into or from the storage frame.

The information contained in said machine readable label may identify the storage frame to the control unit of the robotic device and the control unit can modify the movement of the robotic device on the basis of said information.

In a simplified case, said information stored on the machine readable label is geometrical information of the storage frame which helps the control unit to identify a special kind of storage frame. This allows the use of storage frames of different standard; for example, produced by manufactures of such storage frames or individual storage frames adapted by the user of these storage frames. Moreover, damaged frames, where a repair is not necessary, may be premeasured and said data may be transferred into the machine readable label.

The geometrical information of the storage frame, the number of storage and shape of hanging trays may be information as to the height, length and/or depth of the storage frame. Additionally or alternatively, the geometrical information as to the storage frame stored on the machine readable label is the vertical distance between the tray rails or shelf rails, respectively, of the storage frame and/or the horizontal distance between adjacent delivery positions of the rod-like elements on a tray. Moreover, the geometrical information stored on the machine readable label can alternatively or additionally the vertical height of at least one tray or shelf, respectively, of the storage frame.

In a further embodiment of the present invention, the information stored on the machine readable label is information regarding the kind of the sausage like products. Furthermore, the information can alternatively or additionally be an information as to a further treatment of the sausage-like products. Accordingly, the robotic device can move the rod-like elements to other work stations where the sausage-like products are splashed or the like, before placing them into the storage frame.

In the case, that the information stored on the machine readable label is updated in regular intervals, it is assured, that the label always contains correct information regarding e.g. the kind and dimensions of the storage frame as well as kind and/or the further treatment of the respective products.

In a preferred embodiment of the present invention, the information stored on the machine readable label is read out by a reading device at the entrance to the operating range of the robotic device preferably when the storage frame enters the operating range of the robotic device. This allows the control unit to decide whether a suitable storage frame has been delivered or not. Based on this decision, the control unit may start or stop the production of sausage like-products. It has to be noted that the read-out of the information stored in the machine readable label can be done when the storage frame has already entered the operating range of the robotic device.

Alternatively or additionally, the information stored on the machine readable label is read out by a reading device at a gripping unit of the robotic device after the storage frame has entered the operating range of the robotic device. A reading device at the gripping unit of the robotic device may be used to detect the correct filling position of the storage frame.

The information stored on the machine readable label may be read out by the reading device at the gripping unit of the robotic device each time a rod-like element is placed inside the storage frame by the robotic device. Thereby information regarding the filling status of the storage frame may be updated in regular intervals.

The information stored on the machine readable label and read out by reading device may be compared to information received from the control unit of the production line for producing the sausage-like products. Base on the information received from the production line, the control unit for the robotic device can coordinate the movement of the robotic device to the production status and the filling status of the production line. In case of an error event in the production line, the robotic device can be stopped by its control unit.

In one embodiment, a compatibility signal can be outputted by the control unit on the basis of the comparison of information received from the control unit of the production line for producing sausage-like products and information read out from the machine readable label. By generating a compatibility signal, it can be assured that e.g. the size of the sausage-like like products fits to the size of the storage frame. Otherwise an error signal may be emitted and the production line and the robotic device may be stopped.

Moreover, it is preferable that the information stored on the machine readable label is updated in regular intervals.

In a preferred embodiment, the machine readable label is an RFID label. On RFID labels, information can reliably be stored, modified and readout. Moreover, this technique allows a wireless and contactless transmission of said information.

Depending on the information stored in the label, the robotic device can execute additional treatments to the sausage-like products stored on the rod-like elements before inserting the rod-like elements into the storage frame. Accordingly, the robotic device is easily and promptly adaptable to various of treatments to the sausage-like products.

It has to be noted that the label can have only a read-out characteristic. In order to increase the flexibility of system it is possible to provide the storage frame with a machine readable and writable label which, for example, can be a RFID label.

In a further embodiment, RFID label additional information may be written into the read-/writable label while the storage frame is staying the operating range of the robotic device. In this case, a further device, subsequently arranged to the robotic device, may read said information which may identify the storage frame and/or the kind of product or its state of treatment, whereby e.g. mistakes in the further treatment of the products may be omitted.

The writing device for writing additional information can be arranged separated from the robotic device. However, it can be provided at the robotic device, for example, which is positioned at a gripping unit of the robotic device.

The writing step can occur when the storage frame is entering, staying and/or leaving the operating range of the robotic device.

Said information may also include the size or the weight of the sausage-like product stored in the storage frame, which are transmitted from the control unit to the sausage production line to the writing unit and/or to the control unit of the robotic device.

According to the present invention, the system for controlling a robotic device for inserting or removing rod-like elements, like smoking bars, into or from a storage frame, the rod-like elements serving for storing products, like sausages, each having a sausage-shaped body and a loop on one end of the body for a pendulously storage of the products, comprises at least one movable storage frame for temporary storing rod-like elements, a robotic device for inserting or removing rod-like elements into or from the storage frame and a control unit for controlling the movement of the robotic device.

For executing the above described method, the storage frame further comprises a machine readable label including information regarding the storage frame are stored, and a reading unit for reading out said information from said machine readable label is connected to the system.

The system may further comprise additional treatment stations to which the sausage-like products stored on the rod like elements are moved by the robotic device.

The reading unit for reading out said information from said machine readable label is advantageously positioned in the region of the entrance/exit to the operating range of the robotic device.

Furthermore, it is preferable when the storage frame is not only provided with a machine readable label, but with a machine writable and readable label, for example, a RFID label. In the following, if the machine readable label is mentioned, it is indeed referred to a machine readable/writable label.

The system may further comprise a writing unit for writing information into said machine readable label. Said writing unit for may be positioned in the region of the entrance or exit of the operating range of the robotic device.

Alternatively or additionally, a reading unit may also be positioned in the region of the gripping element of the robotic device.

It may also be advantageous, that a writing unit is positioned in the region of the gripping element of the robotic device.

In a preferred embodiment, the machine readable label is attached at the outside of storage frame, to be not only readable by the reading unit, but also to be visible to a user or operator.

To avoid damages, the machine readable label is positioned in a cavity at the outside of storage frame and may additionally be covered by a protective lamination.

In the case that the system further comprises a production line for producing sausage-like products, the control unit of the production line may be coupled to the control unit of the robotic device to adapt the movement of the robotic device to the production cycle of the production line.

In a further preferred embodiment or the system according to the present invention, the control unit of the production line may be omitted and the control unit of the robotic device also controls the production line.

The features of the system according to the present invention provide the same advantages as described in conjunction with the inventive method.

It is a further object of the invention to provide a method and a system for transporting, removing or inserting longitudinal rod-like elements, with which a correct removal and insertion of the rod-like elements from a production line and/or from or into a storage frame free of damages is assured.

In the present invention, the method for transporting, removing or inserting longitudinal rod-like elements in a handling system, comprising a robotic device and a production line for producing sausage-shaped products, in particular sausages, wherein the rod-like elements, in particular smoking rods, have a central axis, a first end and a second end and serve for storing the sausage-shaped products produced in the production line and wherein two substantially parallel guidances are provided each having a first end and a second end, wherein the rod-like elements are guided along the guidances, wherein, in the area of the first end of the guidances, a first transfer point between the production line and the guidances is defined and wherein, in the area of the second end of the guidances, a second transfer point between the guidances and the robotic device is defined, comprises the following steps moving at least one rod-like element from the first transfer point to the second transfer point for the robotic device along the two guidances, and aligning the rod-like element in the area of the second transfer point such that the rod-like element is in a predefined position.

Rod-like elements have to be removed from the production line and inserted into the storage frame in a predetermined manner to prevent damages of the sausages. In the storage frame several tray rails are positioned. The distance between rod-like elements stored in the storage frame depends on the kind and size of sausage-shaped products being stored on the rod-like elements. If the ends of a rod-like element being inserted in a storage frame do not lie above the corresponding tray rail, the rod-like element is inserted aslope which interrupts the following operating range or, in the worst case, the rod-like element falls down and the sausages are damaged. According to the invention, the rod-like elements are aligned in the area of a second transfer point between the guidances and the robotic device, in particular on the second transfer point, such that the rod-like element is in a predefined position. Then, the rod-like element can be inserted into the storage frame and/or the production line without damaging stored sausage-shaped products.

According to a first embodiment, the rod-like element is aligned by pushing it along its central axis by means of an alignment unit. Alternatively, the rod-like element is pulled in its predefined position.

According to a further embodiment, the rod-like element is aligned moving it by means of the robotic device. The robotic device can align the rod-like element in different ways:

First of all, it is possible, that an optical observation is conducted of the area near the second transfer point for the robotic device, i.e. between the release line, which means the guidances, and the robotic device. The optical observation can be conducted by a camera being connected with a control unit for the robotic device. The fixed camera detects the actual position of the rod-like element which has to be gripped by the robotic device. The actual position is compared with the stored predefined position. If the actual position deviates from the predefined position, a corresponding signal is emitted to the robotic device. The signal includes the values in which the actual position of the rod-like element deviate from the predefined position. The robotic device can adjust these values and engages the rod-like element as predefined such that the rod-like element is aligned by the robotic device.

Alternatively, sensors can be provided detecting the position of the rod-like element. Especially, sensors detect whether the rod-like element engages a stop or does not engage the stop, the stop defining the predefined position of the rod-like element.

It is further possible that the robotic device grips the rod-like element and afterwards laterally moves the gripped rod-like element against a stop. Thereby, the present resistance on the robotic device is measured and it is detected whether the gripped rod-like element is in its predefined position or not. If the rod-like element is not in its predefined position, the rod-like element is put down on the guidances on its predefined position, the robotic device is again positioned in front of the rod-like element and the rod-like element is gripped once more.

According to an embodiment, a signal is emitted by a control unit, the signal indicating whether the rod-like element is correctly aligned. In particular the control unit controls the robotic device. Then, if the rod-like element is not correctly aligned, the robotic device is stopped. The signal may also send to parts of the production line such that the release line and/or the automatic hanging line is stopped or the speed is reduced.

Furthermore, the invention relates to a handling system for transporting, removing or inserting longitudinal rod-like elements, the handling system comprises a robotic device and a production line for producing sausage-shaped products, in particular sausages, wherein the rod-like elements, in particular smoking rods, have a central axis, a first end and a second end and serve for storing sausage-shaped products, in particular sausages, wherein two substantially parallel guidances are provided each having a first end and a second end, wherein the rod-like elements are guided along the guidances, wherein, in the area of the first end of the guidances, a first transfer point between the production line and the guidances is defined and wherein, in the area of the second end of the guidances, a second transfer point between the guidances and the robotic device is defined and wherein with at least one alignment unit aligning the rod-like element in a predefined position is provided in the area of the second transfer point. With respect to the advantages, it is referred to above mentioned explanations.

A holding device can be provided for a temporarily fixing of the rod-like element on the second transfer point for the robotic device. For example, the holding device clamps the rod-like element in its position and afterwards the alignment unit aligns the rod-like element.

According to an embodiment, the holding device is formed by a gripping carriage being movable along the guidances along which the rod-like element is guided.

Alternatively, the holding device is formed by a groove in the guidance along which the rod-like element is guided.

The alignment unit can comprise a pushing element for pushing the rod-like element along its central axis such that the rod-like element is in the predefined position.

It is further possible that a pulling element is provided instead of the pushing element. The pulling element pulls the rod-like element in its predefined position.

Preferably, the pushing element is a cylindrical piston and pushes the first end of the rod-like element in the predefined position in which the second end of the rod-like element engages a stop. The stop can be a second gripping carriage.

According to an embodiment, the alignment unit is part of a gripping carriage, the gripping carriage engaging the rod-like element and moving the rod-like element along the guidances. Thus, the gripping carriage has the pushing element, in particular the cylindrical piston which pushes the first end of the rod-like element in its predefined position.

Alternatively, the alignment unit is a separate part being attached to the guidance along which the rod-like element is guided.

The alignment unit can be connected with the robotic device. A camera or sensors can be part of the alignment system, camera and sensors being connected with a control unit of the robotic device.

Furthermore, the invention relates to an alignment unit suitable for use in an inventive handling system.

The features of the system according to the present invention provide the same advantages as described in conjunction with the inventive method.

It is a further object of the invention to provide a system for transporting longitudinal rod-like elements from a production line to a robotic device, which provides an uninterrupted and fast movement of the rod-like elements to the transfer point for the robotic device free of damages.

In the present invention, the system for transporting longitudinal rod-like elements from a production line to a robotic device, the handling system comprises the robotic device and the production line for producing sausage-shaped products, in particular sausages, wherein the rod-like elements, in particular smoking rods, have a central axis, a first end and a second end and serve for storing sausage-shaped products, wherein two substantially parallel guidances are provided each having a first end and a second end, wherein the rod-like elements are guided along the guidances, wherein, in the area of the first end of the guidances, a first transfer point between the production line and the guidances is defined and wherein, in the area of the second end of the guidances, a second transfer point between the guidances and the robotic device is defined, and at least one gripping carriage is provided for releasably gripping at least one rod-like element, wherein the gripping carriage is linearly movable.

Sausage-shaped products are produced in the production line in a known manner by filling e.g. sausage meat through a filling pipe into a tubular casing and closing the casing e.g. by a clipping machine attaching and closing clips at both ends. A flexible suspension loop is fed to one of the closing clips to be attached together with said clip to the respective end of the sausages. Thereafter, sausages will be placed in regular intervals at a smoking rod in an automatic hanging line. According to the invention, the smoking rod with stored sausages is gripped by a gripping carriage and moved to a second transfer point for the robotic device. Thereby, the movement of the rod-like element is uninterrupted to prevent damages of the sausage-shaped products.

Preferably, the gripping carriage comprises an engaging part with a recess for accommodating the rod-like element. The rod-like element is firmly gripped by the gripping carriage which prevents damages of the stored sausage-shaped products.

According to a preferred embodiment, the engaging part with the recess is replaceable to adapt the gripping carriage to the corresponding cross-section of the rod-like element. The cross-section of a rod-like element is e.g. triangular, circular or rectangular. To firmly grip the respective rod-like element, the recess of the engaging part is variable. The engaging part with the recess is easily replaceable to adapt the engaging part to the present cross-section of the rod-like element.

According to an embodiment, the engaging part of the gripping carriage is vertically movable for engaging and releasing the rod-like element. The gripping carriage is moved above the rod-like element. Afterwards, the gripping carriage is lowered to grip the rod-like element.

Preferably, two gripping carriages are provided, each of which grips the rod-like element in the section of the first and the second end, respectively. In particular, the gripping carriages are movable along the corresponding parallel guidances.

According to an embodiment, at least one slider is provided releasably gripping the rod-like element. Especially, the slider moves the rod-like element from the production line to a transfer point on which the at least one gripping carriage grips the rod-like element.

According to the preferred embodiment, the slider moves the rod-like elements from the first transfer point between the production line and the guidances to a third transfer point and the gripping carriage moves the rod-like elements from the third transfer point to the second transfer point between the guidances and the robotic device. Thus, the handling velocity can be increased and a deceleration on one part can be compensated.

Preferably, the slider comprises a hook being able to engage the rod-like element and the hook is pushed in a raised transport position by a spring and is pushed in a lowered position by the rod-like element.

According to the preferred embodiment, two sliders are provided, the sliders gripping the rod-like element in the section of the first end and the second end, respectively. In particular, the sliders are linearly movable along the corresponding guidance.

A control system and sensors can be provided, wherein the sensors are adapted to detect the position of the at least one carriage and/or the at least one slider and/or the rod-like element and send corresponding signals to the control system, the control system controlling in dependency of the signals sent by the sensors the transportation of the rod-like element. The sensors detect the position of several rod-like elements being moved along the guidances and emit a corresponding signal to the control system. Such a signal can be the information whether a rod-like element lies in the transfer point for the robotic device or not. In dependence of such a signal, the robotic device will be driven amongst others.

According to an embodiment, the at least one carriage comprises an alignment unit aligning the rod-like element in its predefined position.

It is a further object of the invention to provide a system and a method for transporting, removing or inserting rod-like elements, with which a correct removal and insertion of the rod-like elements from or into a storage frame or from an automatic hanging line or from a release line free of damages is assured.

In the present invention, the system for transporting, removing or inserting rod-like elements, in particular smoking rods, from or into a storage frame, from an automatic hanging line or from a release line, the rod-like elements serving for storing sausage-shaped products, in particular sausages, each having a loop for a pendulously storage of the sausage-shaped products, comprises a robotic device with a robotic arm, and a gripping unit for reversibly gripping the rod-like elements, wherein the gripping unit is attached to the robotic arm of the robotic device, wherein the gripping unit comprises at least one bar with at least one seat for receiving the rod-like element and wherein at least one clamping element being linearly movable to clamp the received rod-like element in the seat, wherein the movement is substantially parallel to the bar.

According to the invention, a rod-like element is securely gripped by the gripping unit such that the smoking rod can be removed from the production line, in particular an automatic hanging line, or the release line and inserted into the storage frame free of damages.

Preferably, the bar of the gripping unit comprises two seats for receiving two rod-like elements. Then, two smoking rods can be simultaneously removed from the production line, in particular an automatic hanging line, or the release line and inserted into the storage frame. The storage frame can be filled faster with smoking rods.

According to an embodiment, the clamping element comprises a pushing element being resilient. In particular, the pushing element engaging the rod-like element consists of rubber. The pushing element is a wearing part and is replaceable.

Preferably, the clamping element is attached to a rail, the rail being linearly movable substantially parallel to the bar. The rail takes two positions, namely on opened position, in which the at least one smoking rod is not gripped, and a closed position, in which the at least one smoking rod is securely gripped.

According to an embodiment, the linear movement of the rail is limited by at least one long hole being part of the rail and a corresponding washer with a fastening element extending through the long hole and connecting the rail with the bar.

A drive can be provided which linearly moves the rail. In particular, the drive is a pneumatic drive.

Preferably, the seat is terminated by an insert, the insert being releasably attached to the bar by a fastening element. That means a gripped smoking rod engages, on the one hand, the clamping element and, on the other hand, the insert.

According to an embodiment, the bar comprises several holes for receiving the fastening element such that the insert can be attached in different positions to the bar. The distance between two smoking rods being gripped by the gripping unit depends on the kind and size of the stored sausages. The distance between smoking rods equipped with "small" sausages is lesser than the distance between two smoking rods with "bigger" sausages to prevent a contact of the sausages. To adapt the distance of the two smoking rods to the present kind and size of the sausages, the inserts are attachable in different position to the bars.

According to a preferred embodiment, the insert comprises a side wall being able to engage the rod-like element, the profile of the side wall corresponding to the cross-section of the rod-like element. Thus, the insert is adaptable to the cross-section of the rod-like element. Rod-like elements can have e.g. a triangular, circular or rectangular cross-section, for which reason, the profile of the side wall of the insert is tapered, triangular or straight. Thus, smoking rods can be securely gripped by the gripping unit.

The gripping unit preferably is substantially U-formed, two bars being attached substantially parallel to each other. Due to the two spaced support surfaces formed by the bars, the smoking rod is securely gripped by the gripping unit.

According to a preferred embodiment, a preventing unit for preventing uncontrolled movement of the sausage-shaped products hanging on the rod-like element is attached to the gripping unit. Thus, the degree of free movement of the sausage-shaped products is restricted. The preventing unit is preferably a separate assembly group and therefore suitable for retrofitting.

In particular, the preventing unit comprises a first preventing element being substantially plat-like. The first preventing element is adaptable to the kind and size of stored sausages in changing the height and/or length of the preventing element.

Additionally, the preventing unit can comprise a second preventing element being substantially comb-like. The second preventing unit engages the loops of the sausage-shaped products and prevents a shifting of the sausage-like products on the smoking rods.

Furthermore, the invention relates to a method for transporting, removing or inserting rod-like elements from or into a storage frame or from an automatic hanging line or from a release line having a robotic device used in an inventive handling system, comprising the following steps: positioning the robotic device with the gripping unit such that the rod-like element lies in the seat of the gripping unit, linearly moving the clamping element such that it engages the rod-like element, and removing the rod-like element from the storage frame, from the automatic hanging line or from a release line or inserting the rod-like element into the storage frame. With regard to the advantages, it is referred to the aforesaid advantages and benefits.

In the following, further advantages and embodiments of the inventive method and/or the inventive system are described in conjunction with the attached drawings. Thereby, the expression "left", "right", "below" and "above" are referred to the drawings in an orientation of the drawings which allows the normal reading of the reference numbers.

DETAILED DESCRIPTION OF THE INVENTION

Figure 1:
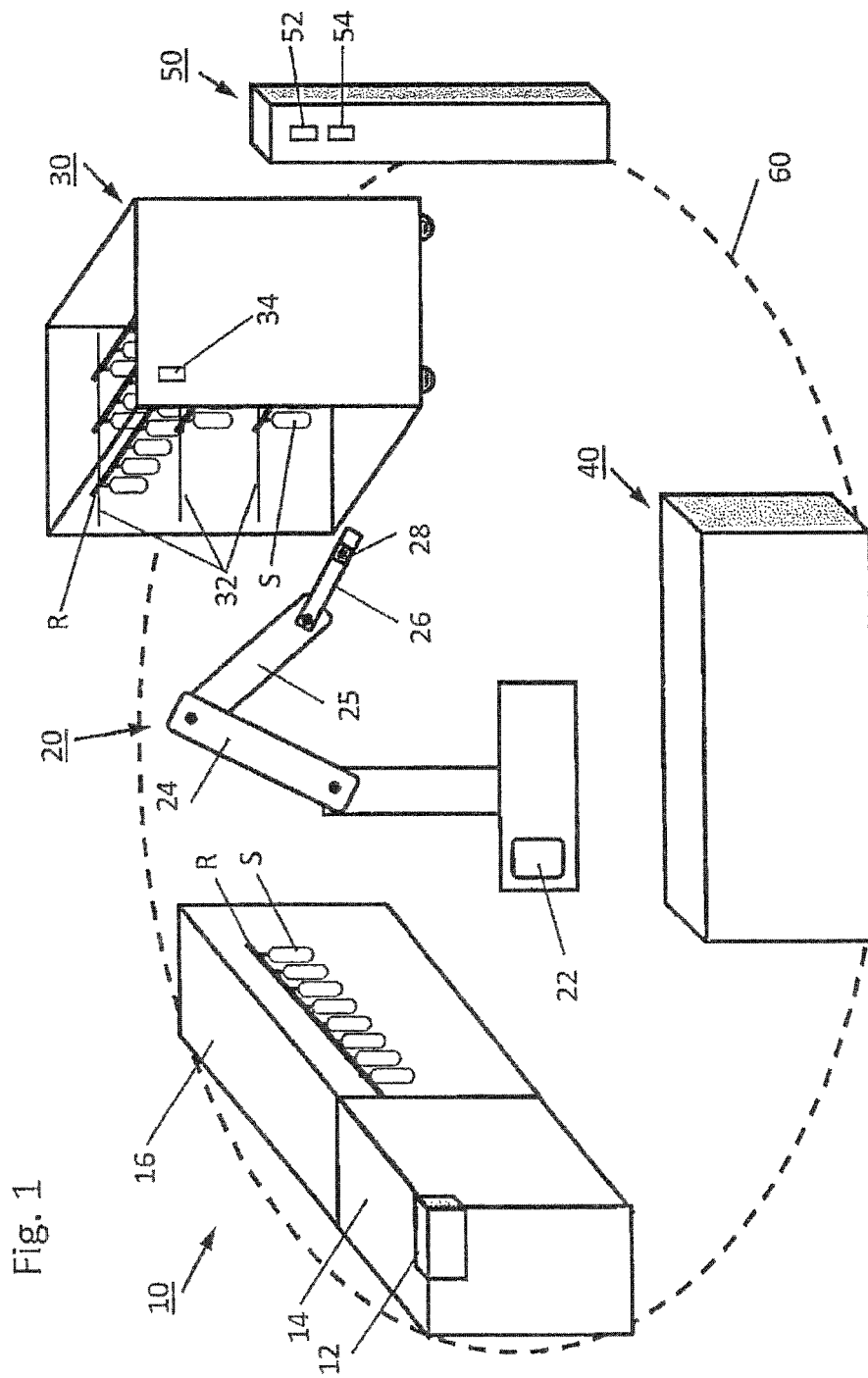
FIG. 1: is a schematically view of a system for producing and handling sausage products including a control system according to the present invention.

The system for producing and handling sausage-like products according to FIG. 1 comprises as main components a schematically shown production line 10 for producing sausage-like products S, like sausages, and storing them on rod-like elements R, like smoking rods, including a control unit 12 for controlling the production line 10, a robotic device 20 having a control unit 22 for controlling the movement of robotic device 20, and a storage frame 30, into which the sausages S hung up at the smoking rods R are to be moved.

As shown in FIG. 1, the system for producing and handling sausage-like products S further comprises a treatment station 40, in which any possible treatment to the sausages S can be executed before they are stored in storage frame 30. A possible treatment may be splashing the sausages S with a smoking fluid or a flavoring fluid. Alternatively, additional treatment stations may belong to the system. If no treatment is necessary to the sausages S between production and storage in storage frame 30, no treatment station needs to be integrated into the system.

Storage frame 30 is positioned in an operating range 60 of robotic device 20 which is illustrated by broken lined circle 60. Inside storage frame 30, tray rails or shelf rails 32 e.g. in the form of horizontally aligned bars are arranged for positioning smoking rods R thereon.

An at least machine readable label like a RFID label 34 is attached at an outside surface of storage frame 30. The label 34 can also be a read-/writable label. In the following, it the machine readable label is mentioned, it is indeed referred to a readable/writable label. RFID label 34 contains data regarding storage frame 30, like size of frame 30 vertical height or distance of tray rails 32 or maximum number of smoking rods storable in storage frame 30 according to kind and size of sausage products S.

The system of FIG. 1 further comprises a frame element 50 positioned in the region of the entrance and exit of the operating range 60 of the robotic device 20. Frame element 50 may be part of a protective grid securing operating range 60. A reading unit 52 and a writing unit 54 for reading out data stored in an RFID label and for writing data into a RFID label are attached to frame element 50.

Robotic device 20, which is a so called joined-arm robot, is positioned in the centre of its operating range 60 to reach all units 10, 30, 40 and stations peripherally arranged inside operating range 60 by its pivotally attached arms 24, 25. At front end of arm 25, a gripping unit 26 is arranged for gripping the smoking rods R with the sausages S hanging thereon inside production line 10 and moving it to storage frame 30. A reading and/or writing unit 28 is attached to gripping unit 26. Reading unit 28 is capable of reading data stored in a machine readable label like a RFID label and/or writing information into the label 34. Control unit 22 for controlling the movement of robotic device 20 is accommodated in the housing of robotic device 20.

Production line 10 for producing sausages S comprises a sausage production device 14 and an automatic hanging line 16. At least automatic hanging line 16 is peripherally arranged inside operating range 60. In production line 10 sausages are produced in a known manner by filling e.g. sausage meat through a filling pipe into a tubular casing and closing the casing by a clipping machine attaching and closing clips at both ends. A flexible suspension loop is fed to one of the closing clips to be attached together with said clip to the respective end of the sausages S. Thereafter, sausages S will be placed in regular intervals at smoking rod R in automatic hanging line 16.

Figure 2:
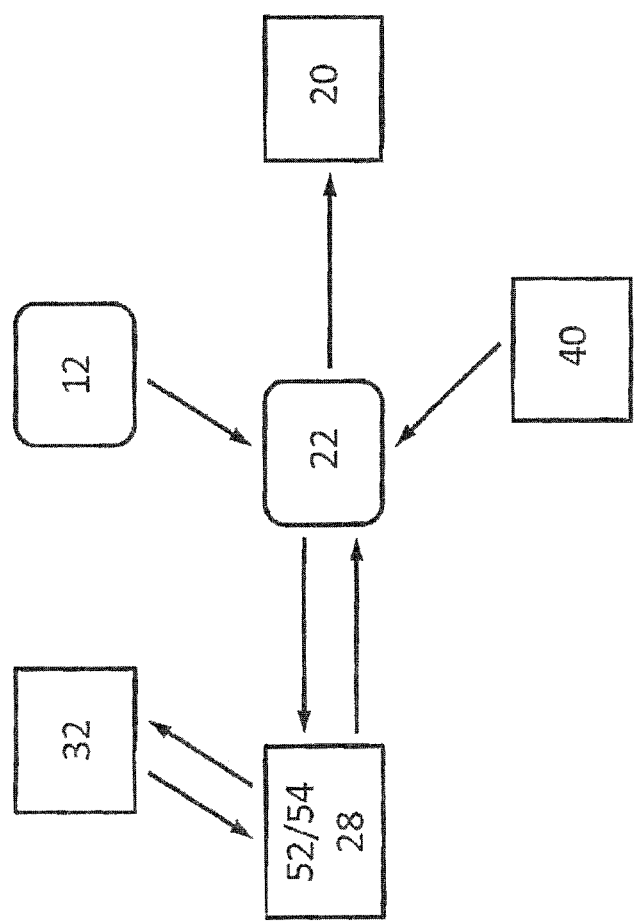
FIG. 2: is a schematically diagram of the control system according to the present invention.

FIG. 2 shows a schematically diagram of the control system according to the present invention, on the basis of which the function of the control system and the method, both according to the invention will be described.

First of all, it has to be noted that a transfer of data between a RFID label 34 and a read or write unit will be done by wireless transmission. Control units 12, 22 of sausage production line 10 and robotic device 20 as well as reading and writing units 28, 52, 54 may be coupled to each other by a wireless connection. Since control units 12, 22 and reading and writing units 28, 52, 54 are locally arranged, also respective control lines may be provided for connecting said units 12, 22, 28, 52, 54.

A smoking operation is executed to the sausages S while they are hanging on smoking rods R, which are stored in a storage frame 30, which will be placed in a smoking chamber (not shown). To avoid unnecessary handling operations, said sausages S will be directly hung up on smoking rods R in the automatic hanging line 16, which is coupled to the sausage production device 14. The number of sausages S to be hung up on one smoking rod R depends on the size of the sausages S. If a predetermined number of sausages S is placed at smoking rod R robotic device 20 grips smoking rod R and moves it to rails of a tray 32 inside storage frame 30. If a storage frame 30 is filled with smoking rods R, it is moved for further treatment to e.g. to the smoking chamber.

While an empty storage frame 30 is moved into operating range 60 of robotic device 20, it passes frame element 50. Thereby, reading unit 52 accommodated in frame element 50 reads data from RFID label 34 of storage frame 30. In a simple case, said data comprising an identification of the kind of storage frame. Additionally, geometrical data as to the length, height and/or depth of storage frame 30 or data regarding the size, the number and vertical distance of tray rails 32 and the number and horizontal distance of smoking rods to be stored on a tray rail 32 in the storage frame and the tray rails 32 on which smoking rods are to be placed according to the size, in particular the length, of sausage products S may be contained in RFID label 34.

Data, read out by reading unit 52, are sent to control unit 22 of robotic device 20. Based on said data, control unit 22 controls the movement of robotic device 20. Moreover, control unit 22 may also receive data from control unit 12 of production line 10. Data sent from control unit 12 may comprise information to the status of production as well as information regarding the size and weight of the sausages S, number of sausages S per smoking rod R, necessary horizontal and vertical distance between two smoking rods R according to the size of the sausages S and the like. Control unit 22 includes said data received from control unit 12 into the control of movement of robotic device 20.

Date read out from RFID label 34 and data received from control unit 12 of production line 10 may be compared by control unit 22. If said data fit to each other, e.g. if the size of the sausages fit to the geometrical data of storage frame 30, control unit 22 may output a compatibility signal to start or continue the production of sausages. On the other hand, if said data do not match, a compatibility signal can stop the sausage production and the movement of the robotic device 20.

If a signal is sent from control unit 12 to control unit 22, which notifies, that a smoking rod R is filled with a predetermined number of sausages S, control unit 22 causes robotic device 20 to move towards the automatic hanging line 16 and to grip the respective smoking rod R. After gripping smoking rod R, robotic device 20 moves smoking rod R into storage device 30 and places it at a position on the rails of a tray 32 according to the size of the sausage products S hanging on smoking rod R and the position and number of rods R already placed inside storage frame 30.

After storage frame 30 is completely filled with sausages S hanging on smoking rods R, storage frame 30 is moved out of the operating range 60. Thereby, storage frame passes frame element 50, which is positioned in the region of the entrance/exit of the operating range 60 of the robotic device 20. Reading unit 52 accommodated in frame element 50 reads data from RFID label 32 at storage frame 30 and approves, that storage frame 30 has left operating range 60 of the robotic device 20. As long as reading unit 52 does not detect storage frame 30 leaving operating range 60 after control unit 22 has confirmed that storage frame 30 has been filled, a safety signal may be provided preventing robotic device 20 from any movement. On the other hand, if no storage frame 30 has entered operating range 60 and thus, it has not been detected by reading unit 52, movement of robotic device 20 can be stopped by control unit 20.

The RFID label 34 is attached at the outside of storage frame 30. To prevent RFID label 34 from damage, a cavity may be provided at the outside of a wall element of storage frame 30 in which RFID label 34 is attached. Additionally, a protecting lamination may cover RFID label 34. To protect RFID label 34 against damage, it is also possible to place it inside storage frame 30.

Simultaneously, writing unit 54 writes information into RFID label regarding the kind and number of sausages and the subsequent treatment steps received from control unit 12 of production line 10 into RFID label 32. Said information may be read by a reading device at the subsequent treatment station to ensure, that correct products are at the right treatment station and in case of e.g. smoking chambers of different sizes, whether size of storage frame 30 fits to the respective smoking chamber.

In the case that an additional treatment station 40 is integrated into the present system inside operating range 60 of robotic device 20, control unit 22 may receive information regarding the additional treatment from control unit 12 of production line 10. Said information will be included into the controlling of movement of robotic device 20. The additional treatment may comprise a single step at the additional treatment station 40 or a number of subsequent steps at station 40. Moreover, other additional stations may be provided inside operating range 60. As long as control unit 22 receives the respective information, each sequence of treatment steps at the additional treatment stations may be executed by robotic device 20.

Alternatively or additionally to reading unit 52, an additional reading unit 28 may be attached to the gripping unit 26 of robotic device 20. In this configuration, it is possible to the reading unit 28 to read data from RFID label 34 each time the robotic device 20 places a smoking rod into storage device 30.

It is further possible to include a writing unit into the gripping device 26 or robotic device 20. This configuration allows omitting frame element 50 together with reading unit 52 and writing unit 54. A storage frame 30 entering operating range 60 of robotic device 20 is in this case detected by robotic device 20, itself. Robotic device 20 can also detect the position of storage frame 30, which is thereby included in the control of movement of robotic device 20 by control unit 22.

In the case that a storage frame 30 is damage accidentally during transportation or has been adapted to new transportation devices or the position of the tray rails 32 has been changed, storage frame 30 may be measured again and new data may be stored in the RFID label 34. Next time storage frame 30 is moved into operating range 60 of robotic device 20, said data are read by reading unit 52 and transmitted to control unit 22 of robotic device 20 and control unit 22 adapts the movement of robotic device 20 to the new size of storage device 30.

Measuring the storage frame 30 may be executed automatically in regular intervals, e.g. each day or ones a week. Additionally, measuring the storage frame 30 should be done after a repair of a damaged storage frame.

The machine readable label 34 has been described as RFID label 34 and the reading and writing units 28, 52, 54 as comprising the respectively reading and writing technique. It is also possible to the label 34 to be any other kind of machine readable/writable label as barcodes, smart labels, chip card, tags or any other suitable electronic or optical technology. In the case that a "read only" technology is used, writing unit 54 may be omitted.

In the case that the rails of trays 32 of the storage device 30 are U-formed profiles, the ends of said U-shaped profiles may be closed e.g. by vertically arranged supports of storage frame 30. In order to place smoking rods by their ends inside said U-shaped trays 32, one of arms 24, 25, 26 of robotic device 20, which is a joined-arm robot, has to execute at least a partially rotation about a vertical axis into one direction, moving smoking rod R into storage frame 30 and thereafter, executing the same at least partially rotation about said vertical axis into the opposite direction.

All data, which are storable on label 34, can be transmitted by a suitable writing unit, which is coupled to e.g. a computer terminal. In one embodiment of the present system, a respective computer for inputting said data into RFID-label 34 is coupled to the system as an additional terminal. It is also possible to integrate such a computer into control units 12 or 22 of sausage production unir 10 or robotic device 20.

Based on the above described controlling method, it is also possible to integrate further robotic devices into the present system, wherein the control units of the robotic devices communicate with each other to coordinate the movement of the various robotic devices. If one additional treatment station is positioned inside the operating range of the at least two robotic devices, a first robotic device can take the smoking rods filled with sausage products out of the production line and put them into the treatment station, whereas the respective second robotic device at the same time removes the rods from the treatment station and places them inside the storage device.

The above mentioned system and method is independent form the inventive systems and method explained in the following.

Figure 3:
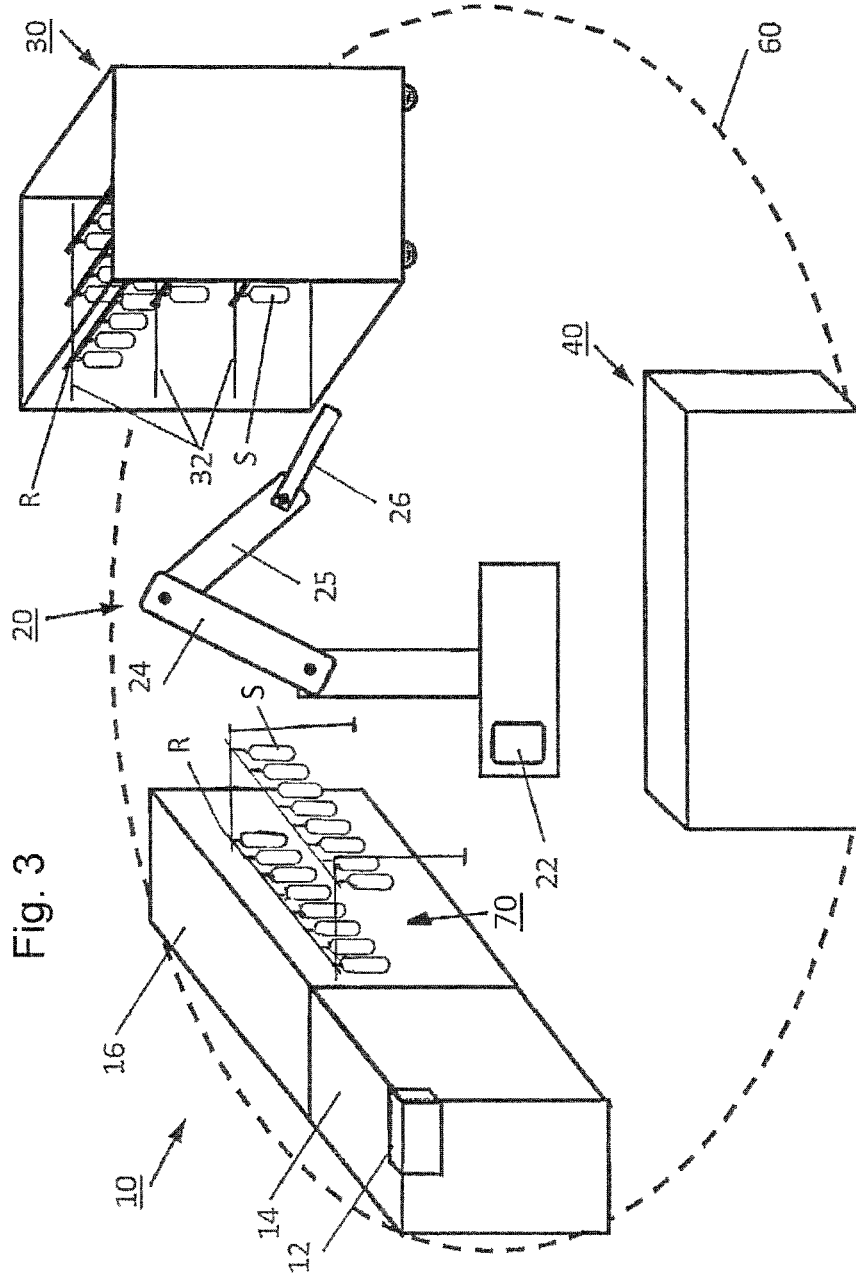
FIG. 3: is a schematically view of a system for handling sausage-shaped products and transporting longitudinal rod-like elements according to the present invention.

The inventive system for producing and handling sausage-like products according to FIG. 3 differs from that shown in FIG. 1 in that a release line 70 is provided, release line 70 being connected with production line 10 for producing sausage-like products S, like sausages, and storing them on longitudinal rod-like elements R, like smoking rods. Rod-like elements R comprises a central axis A (see FIG. 6), a first end $E_1$ and a second end $E_2$ (see FIG. 4).

As already mentioned in conjunction with FIG. 1, production line 10 includes a control unit 12 for controlling the production line 10, a robotic device 20 having a control unit 22 for controlling the movement of robotic device 20, and a storage frame 30, into which the sausages S hung up at the smoking rods R are to be moved.

Additionally, the system for producing and handling sausage-like products S can comprise a treatment station 40, in which any possible treatment to the sausages S can be executed before they are stored in storage frame 30. A possible treatment may be splashing the sausages S with a smoking fluid or a flavoring fluid. Alternatively, additional treatment stations may belong to the system. If no treatment is necessary to the sausages S between production and storage in storage frame 30, no treatment station needs to be integrated into the system.

Storage frame 30 is positioned in an operating range 60 of robotic device 20 which is illustrated by broken lined circle 60. Inside storage frame 30, tray rails or shelf rails 32 e.g. in the form of horizontally aligned bars are arranged for positioning smoking rods R thereon.

Robotic device 20, which is a so called joined-arm robot, is positioned in the centre of its operating range 60 to reach all units 10, 30, 40, 70 and stations peripherally arranged inside operating range 60 by its pivotally attached arms 24, 25. At front end of arm 25, a gripping unit 26 is arranged for gripping the smoking rods R with the sausages S hanging thereon inside production line 10, especially inside release line 70, and moving it to storage frame 30. Control unit 22 for controlling the movement of robotic device 20 is accommodated in the housing of robotic device 20.

Production line 10 for producing sausages S comprises a sausage production device 14 and an automatic hanging line 16. At least automatic hanging line 16 is peripherally arranged inside operating range 60. In production line 10 sausages are produced in a known manner by filling e.g. sausage meat through a filling pipe into a tubular casing and closing the casing by a clipping machine attaching and closing clips at both ends. A flexible suspension loop is fed to one of the closing clips to be attached together with said clip to the respective end of the sausages S. Thereafter, sausages S will be placed in regular intervals at smoking rod R in automatic hanging line 16.

Release line 70 is connected with the production line 10 (see FIG. 3) and comprises two guidances 72. The guidances 72 are substantially parallel to each other, wherein each guidance 72 is substantially straight and height-adjustably supported by two columns 74. The first column 74 is positioned in the area of a first end $G_1$ of the respective guidance 72 and the second column 74 is positioned in the area of the second end $G_2$ of the respective guidance 72. The height of the columns 74 is equal such that the guidances 72 are planar, i.e. without an inclination.

In particular, the area of the first end $G_1$ of each guidance 72 extends into production line 10 such that a rod-like element R can be transferred to the guidances 72. The area of the first end $G_1$ of the guidances 72 defines a first transfer point 76 between production line 10 and release line 70. Rod-like element R is moved—as it is explained in detail later—from the first transfer point 76 to the area of the second end $G_2$ in which the rod-like element R is transferred to robotic device 20. The transfer point between release line 70 and robotic device in the area of the second end $G_2$ of the guidances 72 is called second transfer point 78.

Figure 4:
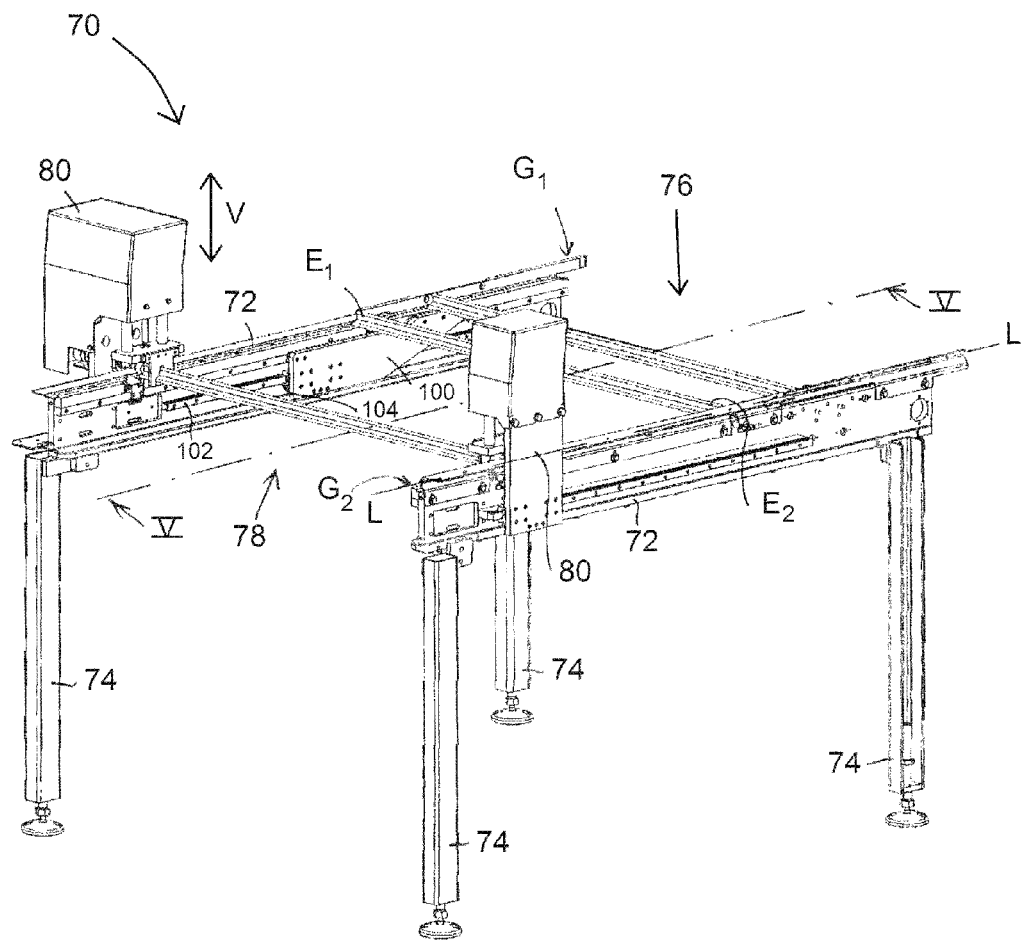
FIG. 4: is a perspective view of a release line with gripping carriages according to the present invention.

For the movement of the rod-like element R from the first transfer point 76 to the second transfer point 78, at least one gripping carriage 80 is used. According to the shown embodiment, two gripping carriages 80 are provided, each gripping carriage 80 being linearly moveable along the correspondence guidance 72. For this purpose, each gripping carriage 80 comprises sliding parts 84 (see FIG. 6) interacting with guide rails 82. Guide rails 82 are attached to the sides of the corresponding guidances 72 facing away from each other. Each guide rail 82 is rectangular (shown in cross-section) and attached to the respective guidance 72 without inclination by means of fastening elements. The length of guide rails 82 terminates the length of movement of gripping carriage 80. As shown in FIG. 4, guide rails 82 extend over two-thirds of the total length of guidances 72.

Figure 7:
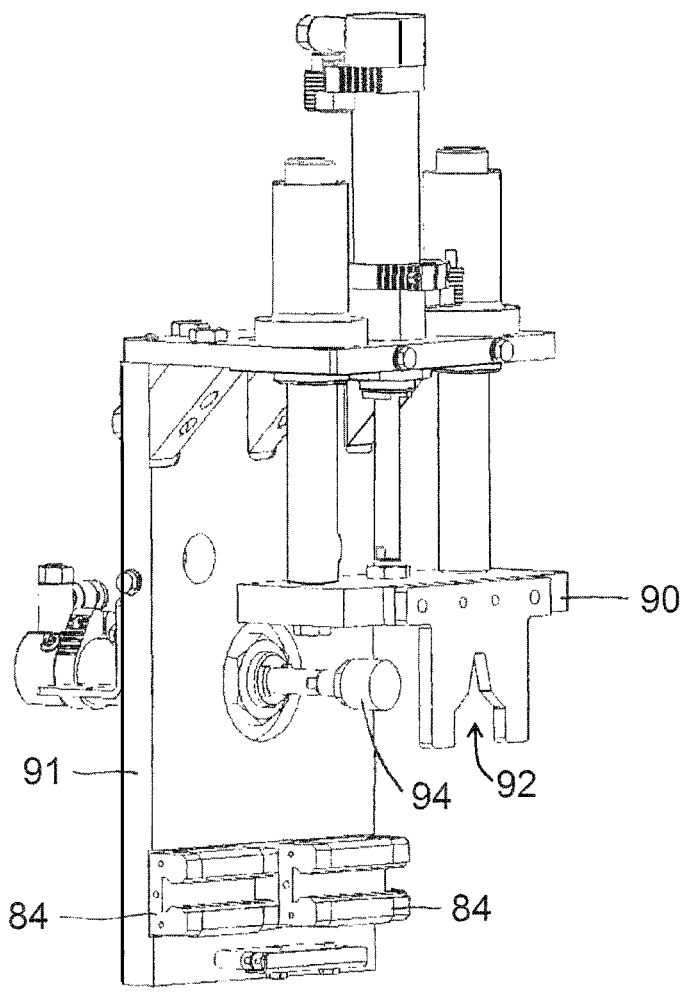

Each gripping carriage 80 comprises an engaging part 90 being connected via a base part 91 with sliding part 84. Engaging part 90 is vertically movable relative to base part 91 of gripping carriage 80 and relative to guidance 72. The vertical direction is indicated with arrow V in FIGS. 4 and 5. Due to the possible vertical movement, rod-like element R can be engaged and gripped by each gripping carriage 80. In particular, engaging part 90 has a recess 92 for accommodating a rod-like element R (see FIG. 7). The rod-like element R is gripped by the respective recess 92 of gripping carriages 80 in the section of the first and second end $E_1$, $E_2$.

The shown recess 92 is substantially triangular, as the cross-section of the gripped rod-like element R is substantially triangular. But, the cross section of the rod-like element R can also be e.g. circular or rectangular (not shown). To adapt gripping carriage 80 to the corresponding cross-section of the rod-like element R, engaging part 90 with recess 92 is replaceable. That means engaging part 90 is attached to base part 91 by fastening means which can be easily removed.

According to another aspect of the invention, which is independent from the above mentioned, gripping carriage 80 shown on the left side (according to FIG. 4) comprises a pushing element 94 forming an alignment unit. Pushing element 94 is provided for pushing the rod-like element R along its central axis A such that the rod-like element R is in its predefined position in the second transfer point 78. In particular, pushing element 94 is a cylindrical piston (see FIG. 7) extending through an opening of base part 91 of carriage 80. Pushing element 94 can push the first end $E_1$ of the rod-like element R towards a stop such that the second end $E_2$ of the rod-like element R engages a stop and lies in its predefined position. According to the shown embodiment, the stop formed by the opposite gripping carriage 80, namely the one being attached to the right guidance 72 (according to FIG. 4). In particular, the stop is formed by base part 91 of gripping carriage 80 (according to FIG. 4).

Besides, on the second transfer point 78, there can be provided a holding device for temporarily fixing the rod-like element R in a direction perpendicular to its axis A. The holding device can be formed by gripping carriages 80 themselves or two grooves (not shown) in the guidances 72.

Figure 5:
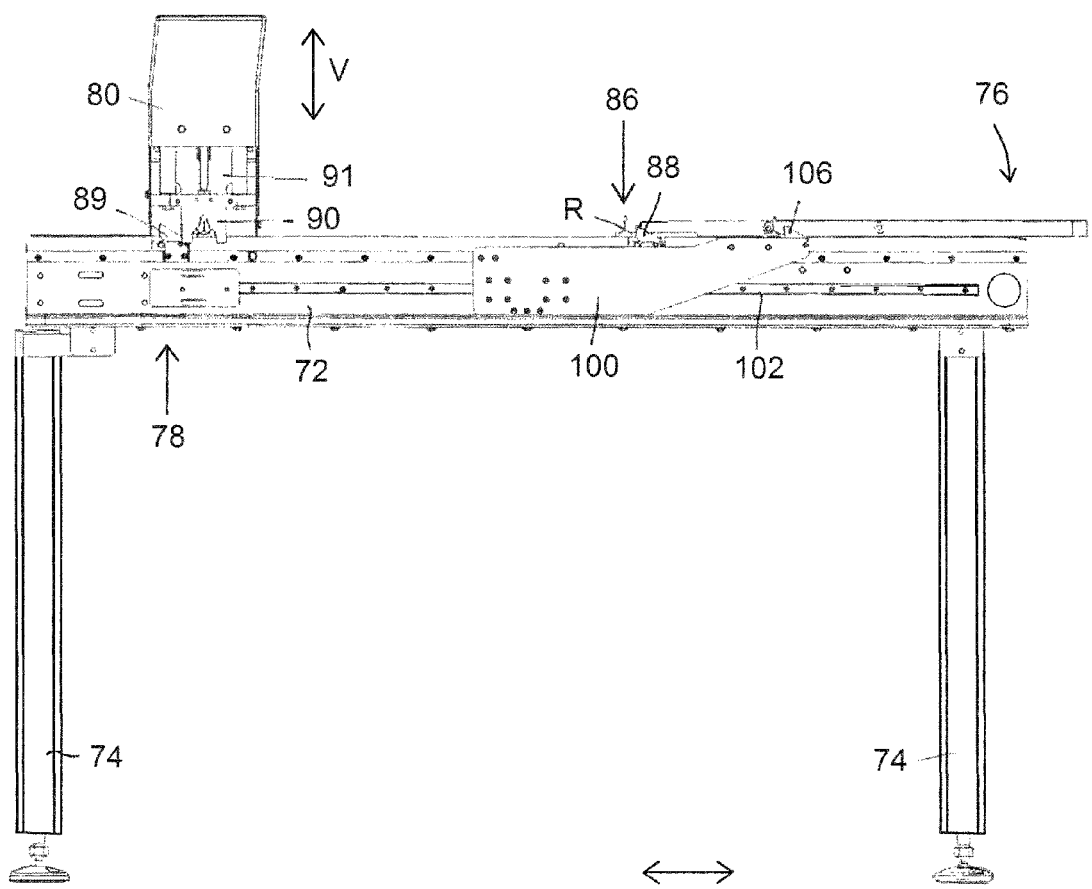
FIG. 5: is a sectional view of the release line along the line V-V in FIG. 4, FIG. 6: is a front view of a part of the release line according to FIGS. 4 and 5, FIG. 7: is a perspective view of a gripping carriage being part of the release line shown in FIGS. 4 to 6, FIG. 8: is a schematically view of a system for handling sausage-shaped products and transporting rod-like elements with a gripping unit according to the present invention.
Figure 6:
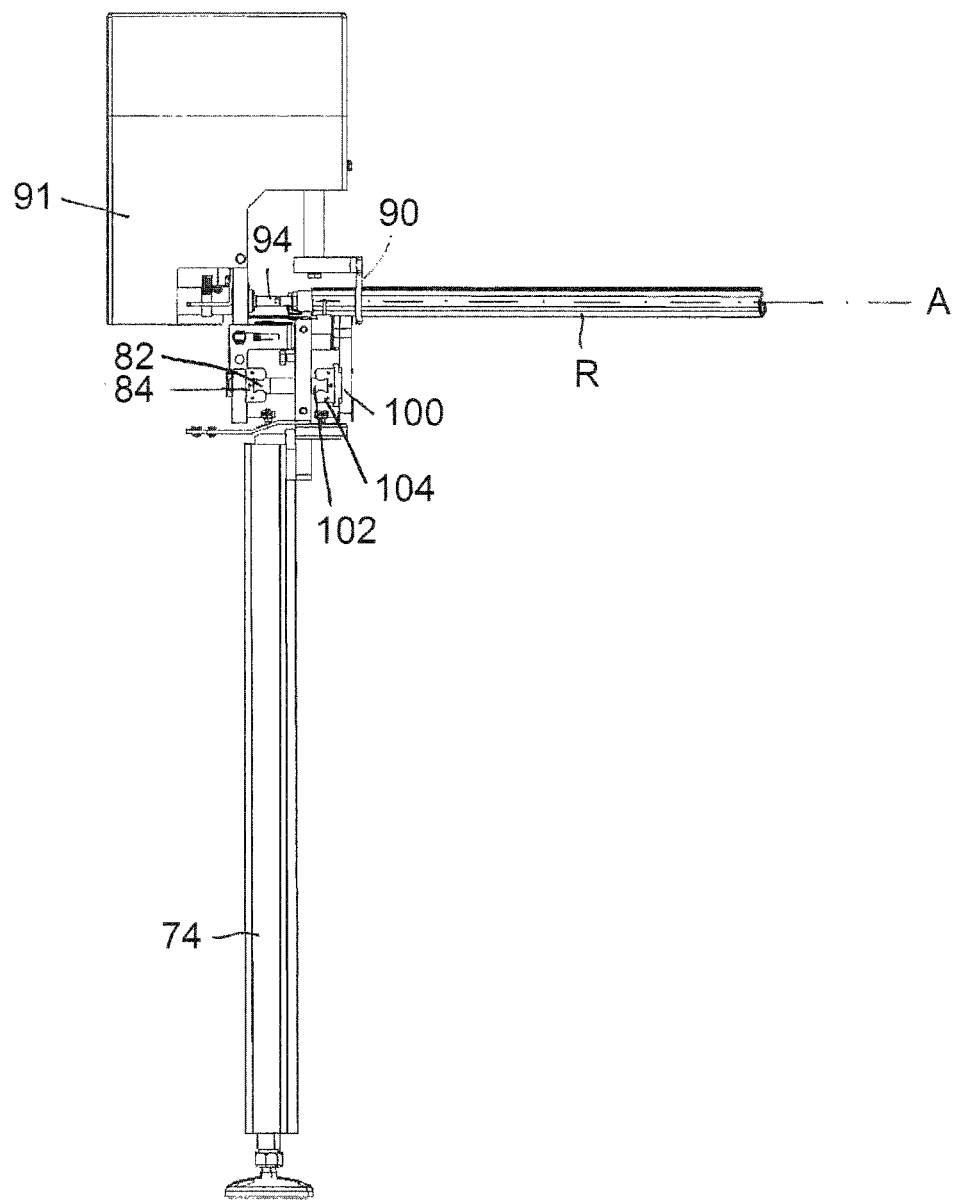

According to the shown embodiment, each gripping carriage 80 is moveable between the second transfer point 78 for the robotic device 20 and a third transfer point 86. Third transfer point 86 is defined by a hook 88 and second transfer point 78 is defined by a hook 89. Both hooks 88, 89 are shown in FIGS. 4 to 6 in its raised transport position to which they are pushed by a spring (not shown) such that they protrude over the respective guidance 72. In the transport position, hooks 88, 89 are able to engage rod-like elements R. Furthermore, hooks 88, 89 can take a lowered position in which they do not protrude over the respective guidance 72 and a rod-like element R can be passed over the lowered hook 88, 89.

For moving the rod-like elements R from the first transfer point 76 to the third transfer point 86, two sliders 100 are provided being polygonal and plat-like. Each slider 100 is linearly movable along the corresponding guidance 72. For this purpose, a guide rail 102 is attached to the corresponding guidance 72 with which a sliding part 104 on each slider 100 interacts. Guide rails 102 are attached on the "inner" side of corresponding guidance 72, i.e. on the side of guidance 72 facing the opposite guidance 72.

Each slider 100 comprises on its right end (according to FIG. 5) a hook 106 being able to engage and pull rod-like element R. In particular, sliders 100 engage the rod-like elements R in the section of the first end $E_1$ and the second end $E_2$, respectively. Hook 106 corresponds to hooks 88, 89 as already explained and can take a raised transport position and a lowered position.

In the following, the operating mode of the present invention is described.

In production line 10 sausages are produced in a known manner by filling e.g. sausage meat through a filling pipe into a tubular casing and closing the casing by a clipping machine attaching and closing clips at both ends. A flexible suspension loop is fed to one of the closing clips to be attached together with said clip to the respective end of the sausages S. Thereafter, sausages S will be placed in regular intervals at smoking rod R in automatic hanging line 16.

According to the invention, to grip the smoking rod R equipped with sausages S sliders 100 are moved to the first end $G_1$ of guidances 72, that means to the right side (according to FIG. 4). In moving sliders 100 towards the first end $G_1$ of guidances 72, hooks 106 are pushed into its lowered position when hooks 106 engage the equipped rod-like element R. As soon as sliders 100 are moved behind rod-like element R, hooks 106 are pushed in its raised transport position in which they protrude over the respective guidance 72 and can engage the respective rod-like element R. The point, on which the rod-like element R is gripped by sliders 100, is called first transfer point 76.

Afterwards, sliders 100 are moved towards the second end $G_2$ of guidances 72, that means towards the left side (according to FIG. 4), wherein the gripped rod-like element R with the stored sausages S is moved away from production line 10. As soon as the rod-like element R reaches hooks 88, hooks 88 are pushed down by rod-like element R into their lowered position. Once the rod-like element R has passed hooks 88, sliders 100 are stopped. The point is also called third transfer point 86, as, on this point, rod-like element R is gripped by gripping carriages 80.

To grip rod-like element R on transfer point 86, gripping carriages 80 approaches from the right side (according to FIGS. 4 and 5). Thereby, engaging part 90 of gripping carriages 80 are in their lowered position and push rod-like element R to the right side until rod-like element R engages hooks 88. I.e. the rod-like element R is aligned and lies substantially perpendicular to the longitudinal axis L of guidances 72.

Afterwards, engaging parts 90 of gripping carriages 80 are vertically moved upwards (see arrow V in FIG. 5) and are moved towards the first end $G_1$ of guidances 72 until they are positioned above the rod-like element R. Then, engaging parts 90 of gripping carriages 80 are lowered such that engaging parts 90 engage rod-like element R. That means, rod-like element R is gripped by gripping carriages 80.

Gripping carriages 80 are moved with gripped rod-like element R towards the second end $G_2$ of guidances 72, that means, to the left side (according to FIGS. 4 and 5) until the rod-like element R reaches the second transfer point 78 which is defined by hooks 89.

On the second transfer point 78, the robotic device 20 grips the rod-like element R to move it e.g. to a storage frame 30. For removing smoking rods R from release line 70 into storage frame 30, the robotic device 20 is positioned in front of the guidances 72. Gripping unit 26 grips the smoking rod R and smoking rod R is moved linearly out of the release line 70. Thereby, hooks 89 are pushed in the lowered position.

Afterwards, robotic device 22 is moved to storage frame 30. Smoking rod R is positioned substantially parallel to tray rails 32 of storage frame 30 and gripping unit 26 is linearly moved into storage frame 30 and lowered until smoking rods R lie onto respective tray rail 32. Then, robotic device 20 can be positioned once more in front of release line 70.

Until robotic device 20 grips the rod-like element R, rod-like element R can be temporarily fixed on the second transfer point 78 by gripping carriages 80 themselves or grooves (not shown) formed in guidances 72. Once robotic device 20 grips rod-like element R, gripping carriages 80 are moved back to the transfer position 86 to grip another rod-like element R.

During the method, gripping carriages 80, sliders 100 and robotic device 20 can be moved simultaneously. Among other things, the simultaneously movement of sliders and carriages is possible, as guide rails of gripping carriages 80 and sliders 100 are positioned on opposite sides of guidances 72.

Sensors (not shown) can be provided to detect the position of rod-like elements and to control the movement of gripping carriages 80, sliders 100 and/or robotic device 20.

According to another aspect of the invention, which is independent from the above mentioned, for preventing that sausages S are damaged by moving and storing rod-like elements R into storage frame, the rod-like element R can be aligned on the second transfer point 78. Thereby, the first end $E_1$ of the rod-like element R is pushed by pushing element 94 being part of gripping carriage 80 such that the second end $E_2$ of rod-like element R engages a stop. In particular, the second end $E_2$ of rod-like element R is pushed to the base part 91 of opposite gripping carriage 80 being positioned at the right guidance 72 (according to FIG. 4). Once rod-like element R engages the stop, smoking rod R is in its predefined position.

Afterwards, robotic device 20 is positioned in front of guidances 72 and grips smoking rod R. Until robotic device 20 grips the rod-like element, rod-like element R can be releasably fixed by gripping carriages 80 themselves or grooves (not shown) formed in guidances 72.

As rod-like elements R are aligned such that the rod-like elements R are in its predefined position, rod-like element R can be inserted into storage frame 30 without damaging stored sausage-shaped products S. This is explained in detail in the following.

As the robotic device 20 always grips the rod-like element R in the same way, always stands in the same position in front of release line 70 and rod-like element R is in its predefined position, rod-like element R can be positioned in tray rails 32 of storage frame 30, wherein it is prevented that rod-like element miss a tray rail 32. In storage frame 30 several tray rails 32 are positioned. The distance between rod-like elements R stored in storage frame 30 depends on the kind and size of sausage-shaped products S being stored on rod-like elements R. If the ends of a rod-like element R being inserted in storage frame 30 do not lie above the corresponding tray rail, the rod-like element R is inserted aslope which interrupts the following operating range or, in the worst case, rod-like element R falls down and the sausages S are damaged. As rod-like elements are aligned such that the rod-like elements R are in a predefined position, rod-like elements R can be inserted into storage frame 30 without damaging stored sausage-shaped products S.

Alternatively, rod-like elements can be aligned by the robotic device itself. For example, it is possible, that an optical observation is conducted of the area near the second transfer point 78 between the release line 70, which means the guidances 72, and the robotic device 20. The optical observation can be conducted by a camera (not shown) being stationary attached to e.g. release line 70 and being connected with the control unit 22 for the robotic device 20. The fixed camera detects the actual position of the rod-like element R which has to be gripped by the robotic device 20. The actual position is compared with a predefined position. If the actual position deviates from the predefined position, a corresponding signal is emitted to the robotic device 22. The signal includes the values in which the actual position of the rod-like element R deviates from the predefined position. The robotic device 20 can adjust these values and engages the rod-like element R as predefined such that the rod-like element is aligned by the robotic device 20.

According to a further, not shown possibility to align the rod-like elements R by the robotic device 20 itself, sensors (not shown) can be provided detecting the position of the rod-like element R. Especially, sensors detect whether the rod-like element R engages a stop or does not engage the stop, the stop defining the predefined position.

It is further possible that the robotic device 20 grips the rod-like element R and laterally moves the gripped rod-like element R against a stop. Thereby, the present resistance on the robotic device 20 is measured and it is detected whether the gripped rod-like element R is in the predefined position or not. If the rod-like element R is not in the predefined position, the rod-like element R is put down on the guidances 72 on the predefined position, the robotic device 20 is again positioned in front of the rod-like element R and the rod-like element R is gripped once more.

The control unit 22 of the robotic device 20 can emit a signal, the signal indicating whether the rod-like element R is correctly aligned. If the rod-like element R is not correctly aligned, the robotic device 20 is stopped.

The above mentioned system and method is independent form the inventive systems and method explained in the following.

Figure 8:
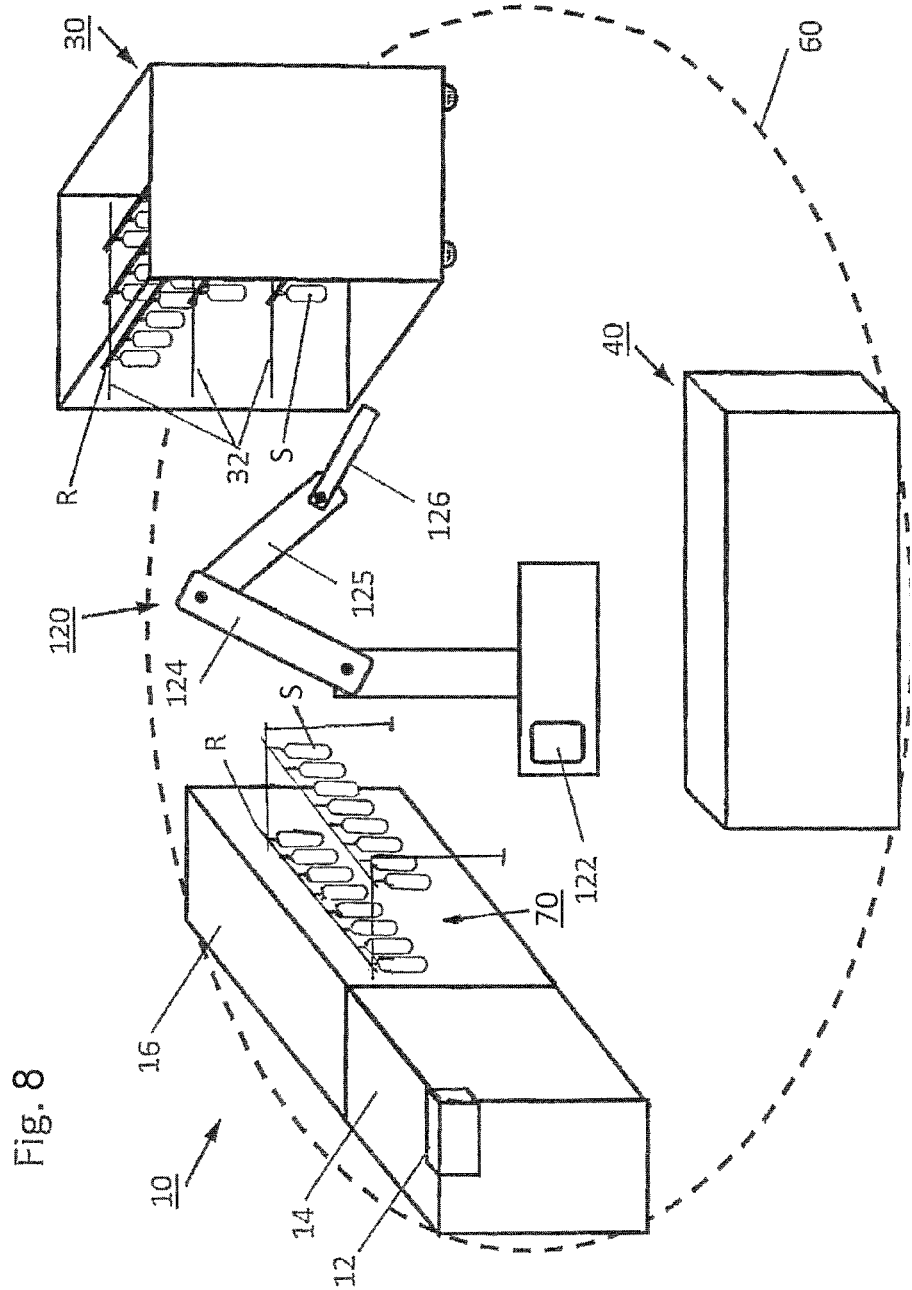

The inventive system for producing and handling sausage-like products is schematically shown in FIG. 8. A production line 10 is provided for producing sausage-like products S, like sausages, and storing them on longitudinal rod-like elements R, like smoking rods.

As already mentioned in conjunction with FIG. 1, production line 10 includes a control unit 12 for controlling the production line 10, a robotic device 120 having a control unit 122 for controlling the movement of robotic device 120, and a storage frame 30, into which the sausages S hung up at the smoking rods R are to be moved.

Additionally, the system for producing and handling sausage-like products S can comprise a treatment station 40, in which any possible treatment to the sausages S can be executed before they are stored in storage frame 30. A possible treatment may be splashing the sausages S with a smoking fluid or a flavoring fluid. Alternatively, additional treatment stations may belong to the system. If no treatment is necessary to the sausages S between production and storage in storage frame 30, no treatment station needs to be integrated into the system.

Furthermore, the system for producing and handling sausage-like products can comprise a release line 70 which is schematically shown in FIG. 8 and connected with production line 10.

Production line 10 for producing sausages S comprises a sausage production device 14 and an automatic hanging line 16. At least automatic hanging line 16 is peripherally arranged inside operating range 60. In production line 10 sausages are produced in a known manner by filling e.g. sausage meat through a filling pipe into a tubular casing and closing the casing by a clipping machine attaching and closing clips at both ends. A flexible suspension loop is fed to one of the closing clips to be attached together with said clip to the respective end of the sausages S. Thereafter, sausages S will be placed in regular intervals at smoking rod R in automatic hanging line 16.

Storage frame 30 is positioned in an operating range 60 of robotic device 120 which is illustrated by broken lined circle 60. Inside storage frame 30, tray rails or shelf rails 32 e.g. in the form of horizontally aligned bars are arranged for positioning smoking rods R thereon.

Robotic device 120, which is a so called joined-arm robot, is positioned in the centre of its operating range 60 to reach all units 10, 30, 40, 70 and stations peripherally arranged inside operating range 60 by its pivotally attached arms 124, 125. Robotic device 120 is movably in three dimensions. At front end of arm 125, a gripping unit 126, which is described in detail below, is arranged for gripping the smoking rods R with the sausages S hanging thereon inside production line 10 or inside release line 70 and moving it to storage frame 30. Control unit 122 for controlling the movement of robotic device 120 is accommodated in the housing of robotic device 120.

Gripping unit 126 for reversibly gripping rod-like elements R is shown in detail in FIGS. 9 to 13. Gripping unit 126 can take two positions, namely a closed position in which two rod-like elements R are gripped (see FIGS. 9 to 11) and an opened position in which no rod-like element R is gripped (see FIGS. 12 and 13).

Figure 9:
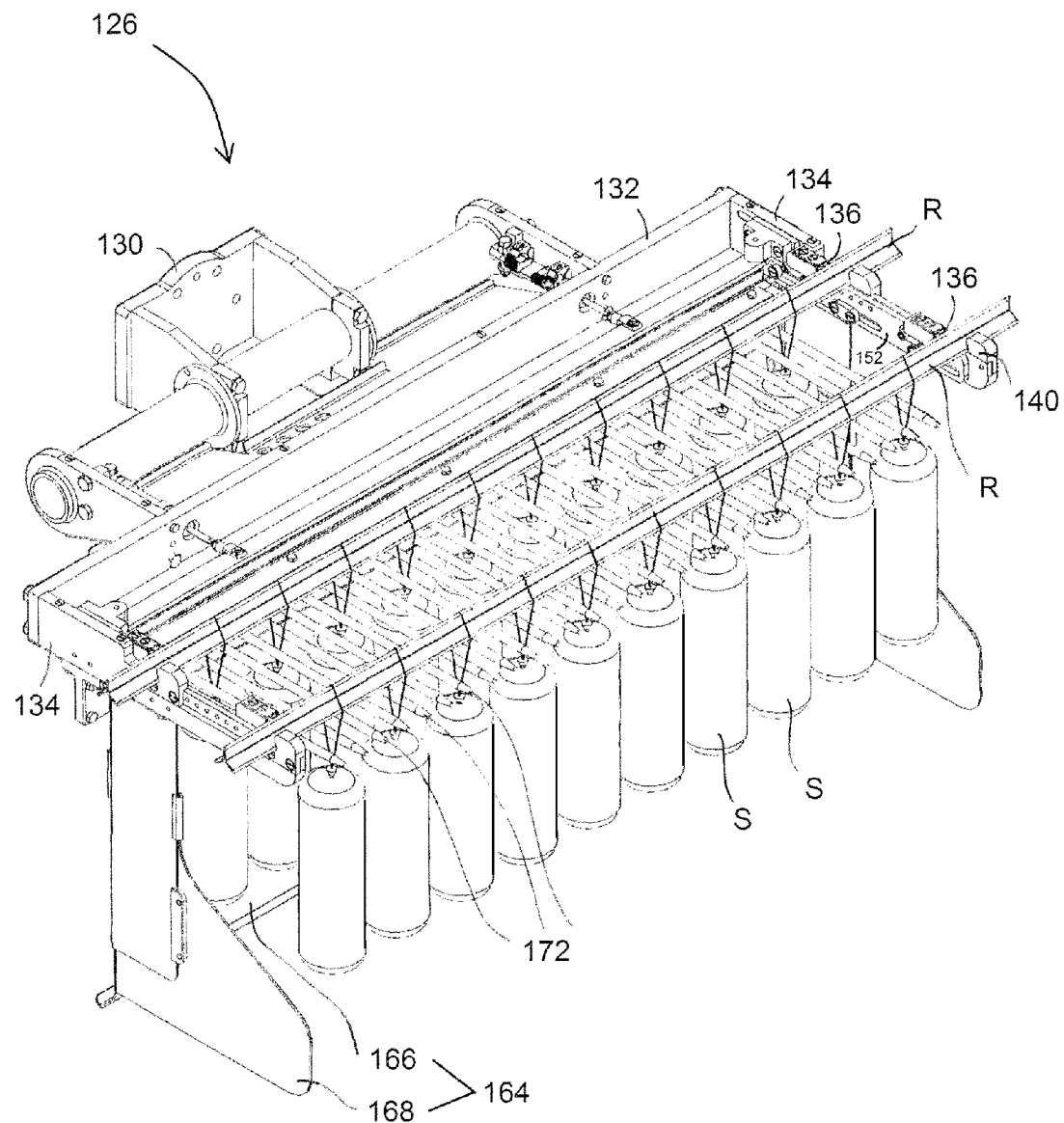
FIG. 9: is a perspective view of a gripping unit according to FIG. 8 in a closed position.
Figure 10:
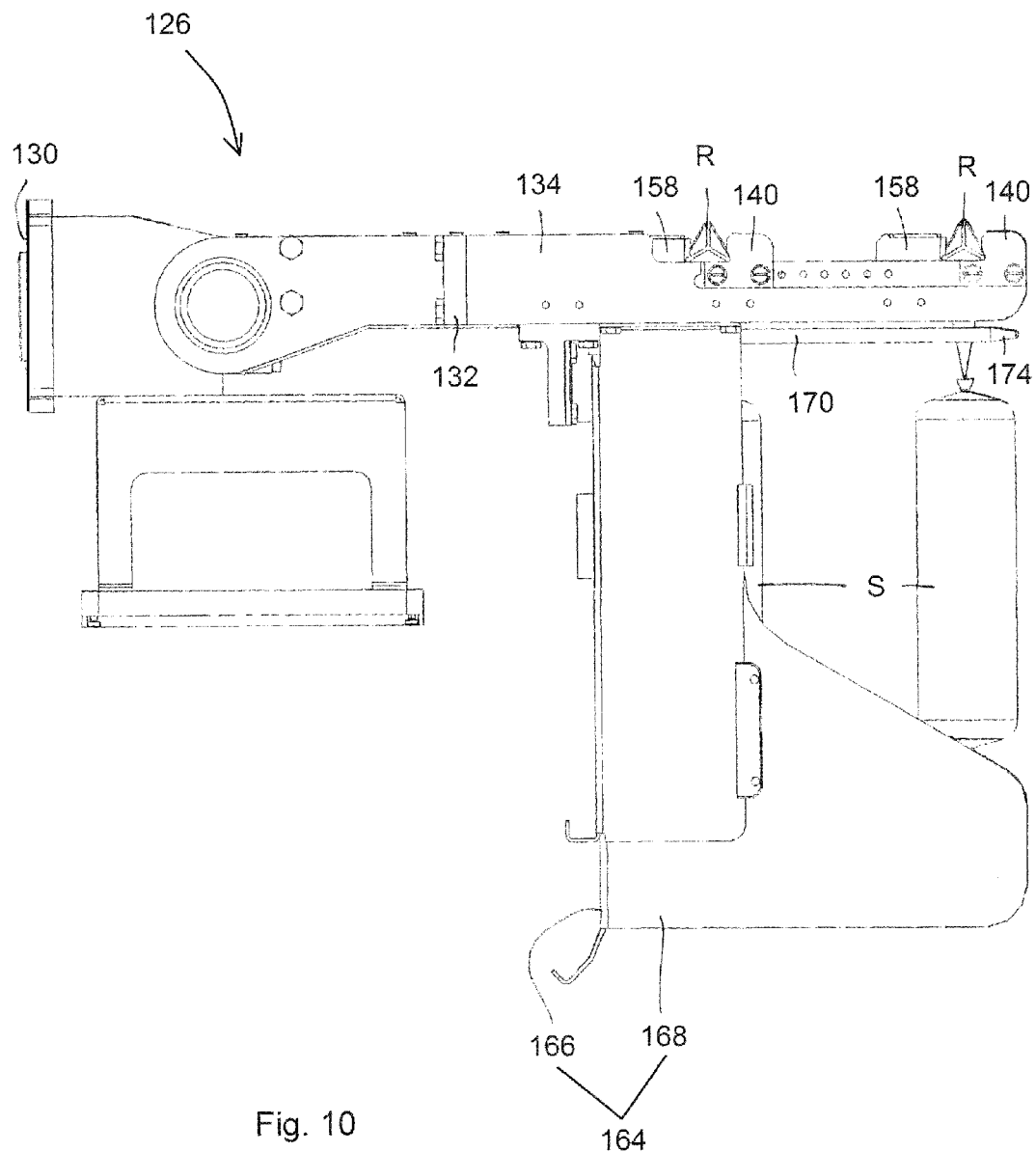
FIG. 10: is a side view of the gripping unit of FIG. 9, FIG. 11: is a perspective view of a part of the gripping unit according to FIGS. 9 and 10 in a closed position.

Gripping unit 126 is attachable to robotic arm 125 via a plate 130 (see FIG. 9) and is substantially U-shaped with a transverse beam 132 and two bars 134 being fixed to the respective end of transverse beam 132 such that they extend substantially perpendicular to beam 132 and are substantially parallel to each other (see FIG. 9). The distance between the two bars 134 is lesser than the length of the gripped smoking rod R such that both ends of the gripped smoking rod R protrude over the bars 134.

Each bar 134 has at least one seat 136, i.e. a planar bearing surface, for receiving a rod-like element R. In particular, according to the shown embodiment, each bar 134 comprises two seats 136. Seats 136 are positioned on the same height on bar 134. Furthermore, the seats 136 are positioned one after another shown in the longitudinal direction of bars 134.

Each seat 136 is terminated, on the one hand, by a rounded edge 138 being part of the respective bar 134 and, on the other hand, by an insert 140. Insert 140 is replaceable and fixed to bar 134 by fastening elements 142 (see e.g. FIGS. 10 and 13). In particular, each insert 140 is attached to the respective bar by two fastening elements 142. As each bar 134 comprises several, in particular eight, adjoining holes 144, inserts 140 being positioned closer to transverse beam 132 can be individually attached in different positions to the respective bar 134. As it is explained in detail below, the corresponding position of clamping element 158 is also changeable such that the distance between the two gripped rod-like elements R is changeable and can be adjusted to the kind and in particular sizes of the stored sausage-shaped products S.

The wall of insert 140 facing gripped rod-like element R is numbered with 146. Side wall 146 abuts on the bearing face for rod-like element R. When a rod-like element R is gripped, it engages side wall 146 of insert 140. For providing a securely gripping of smoking rods R, profile of side wall 146 is changeable and adaptable to the used cross-section of smoking rods R.

Figure 14:
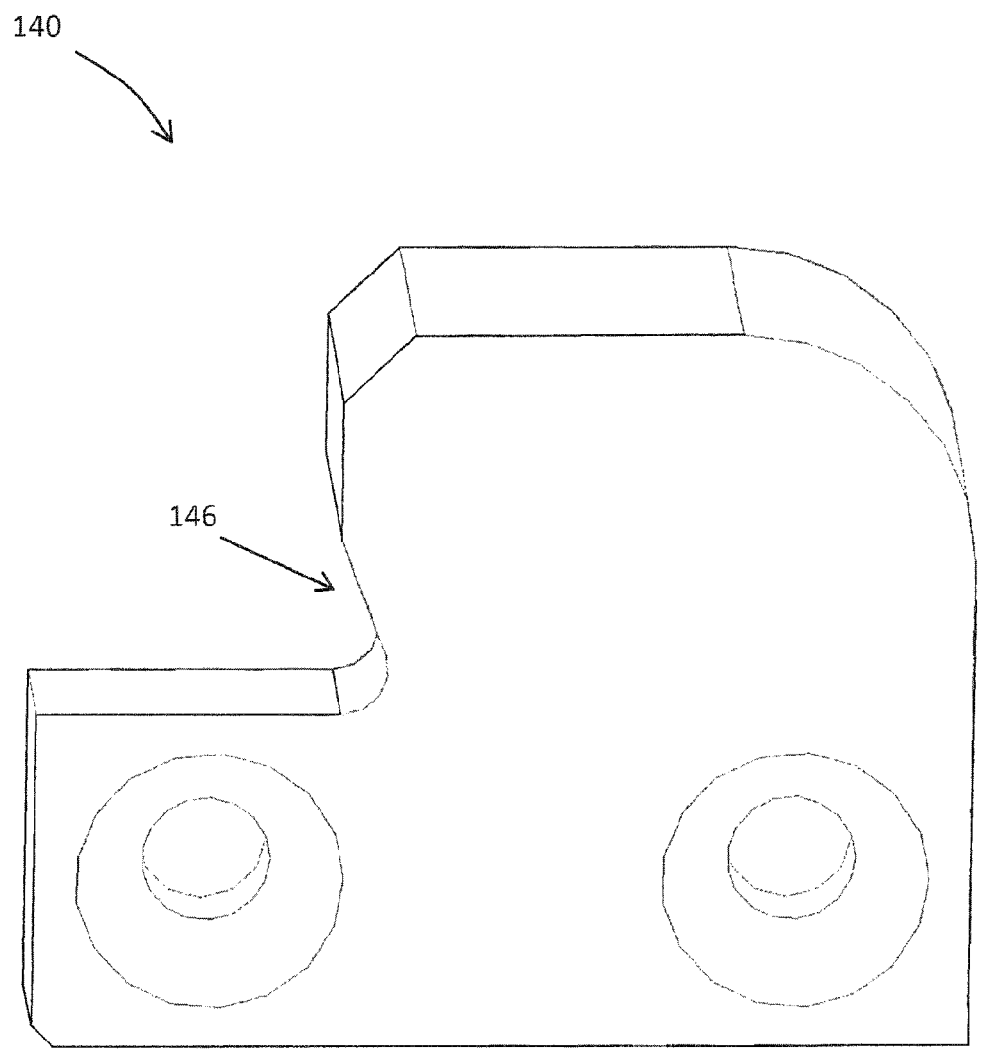

For example, if the gripped rod-like element R has a triangular cross-section, inserts 140 are used having a linearly tapered section as shown in FIG. 14 to securely grip the smoking rod R.

If, however, the cross-section of rod-like elements R is circular, inserts 140 having a side wall with a triangular section are fixed to bars 134 (not shown). Such a triangular section securely grips rod-like elements R with different diameters.

Alternatively, side wall of inserts 140 can have a straight section (shown in cross-section), if the cross-section of rod-like elements R is rectangular (not shown).

Figure 15:
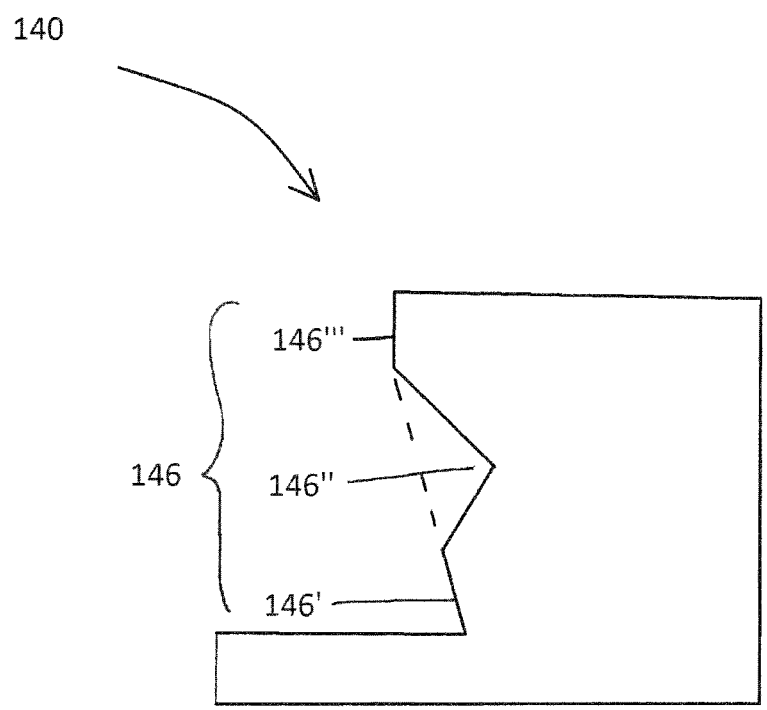

Furthermore, it is possible to provide inserts with a tapered section, a triangular section and a straight section, wherein the parts lie subsequent to each other (see FIG. 15). Such inserts 140 can be used for smoking rods with triangular, circular and rectangular profiles.

On the sides of bars 134 facing each other, i.e. on the "inner sides" of bars 134, three washers 148 being substantially oval (shown in cross-section) are fixed by fastening elements 150 to bars 134. Each washer 148 comprises a smaller area which extends through a respective long hole 144 of a rail 152. The length of long holes 144 is chosen such that rails 152 are linearly movable relative to bars 134. The movement of rails 152 is limited by the length of long holes 144 and is parallel to the respective bar 134.

For moving the rails 152 parallel to bars 134, rails are connected with each other by a transverse connection 154 being substantially parallel to transverse beam 132. A drive 156 which is schematically shown in FIG. 9 is connected with transverse connection 154 and can move the two rails 152 forward and backward along respective bars 134 such that gripping unit 126 takes its opened position and its closed position. Drive 156 is in particular a pneumatic drive. In its opened position, clamping elements 158 being releasably attached to each rail 152 do not engage rod-like elements R being positioned in seats 136. However, in its closed position, clamping elements 158 engage rod-like elements R being positioned in seats 136.

Figure 11:
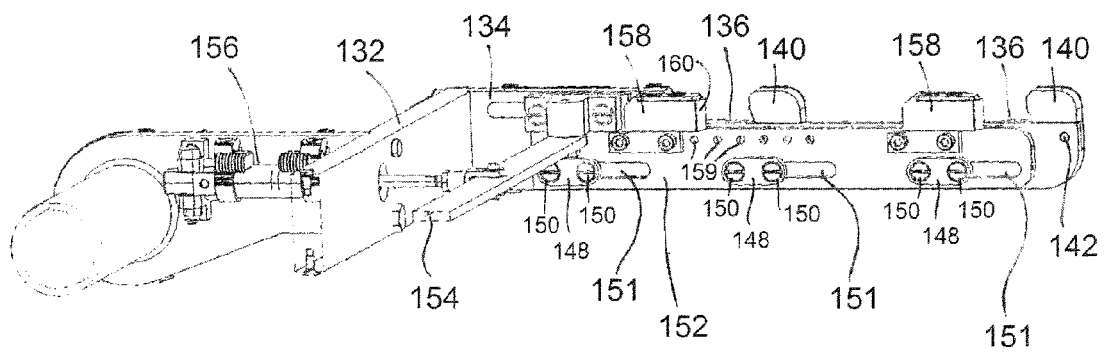
Figure 12:
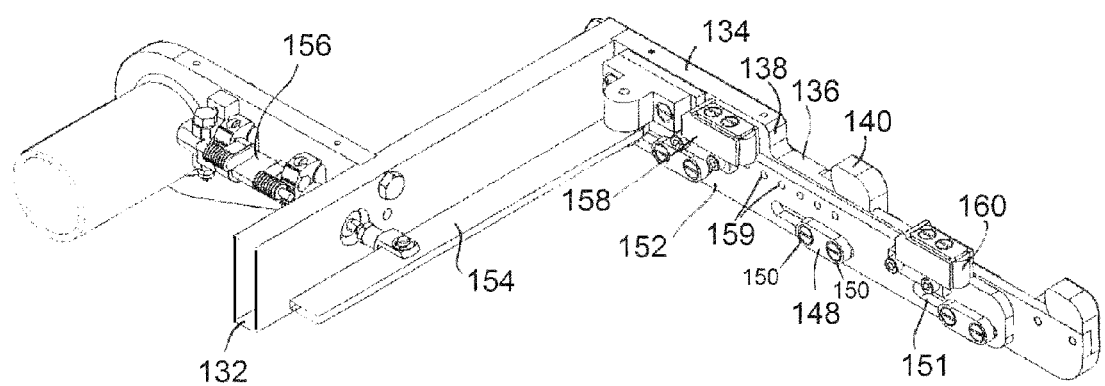
FIG. 12: is a perspective view of a part of the gripping unit in an opened position.
Figure 13:
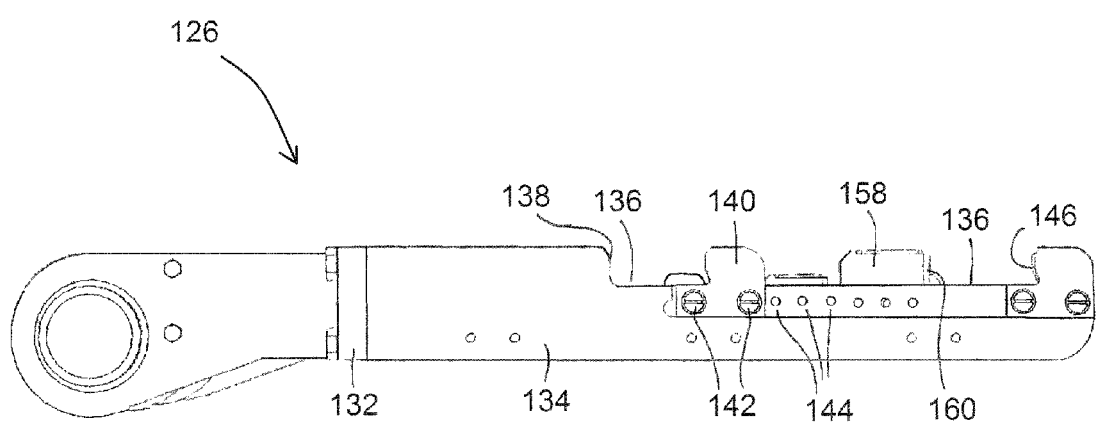
FIG. 13: is a side view of the gripping unit of FIG. 12, FIG. 14: is a perspective view of an insert of the gripping unit according to FIGS. 9 to 13, and FIG. 15: is a side view of an alternative insert of the gripping unit according to FIGS. 9 to 13.

As already mentioned above, clamping elements 158 being positioned closer to transverse beam 132 can be individually attached in different positions to the respective bar 134, since several adjoining holes 159 are provided (see FIGS. 11 and 12). The corresponding position of inserts 140 is further changeable such that the distance between the two gripped rod-like elements R is adjustable to the kind and in particular size of the stored sausage-shaped products S.

Each clamping element 158 has a pushing element 160 which being able to engage the respective rod-like element R. In particular, pushing elements 160 are circular (shown in cross-section), consists of a resilient material like rubber and are replaceable.

Furthermore, gripping unit 126 comprises a preventing unit 162 for preventing uncontrolled movement of the sausages S hanging up on smoking rods 40 and being transported by the robotic device 120. Thus, preventing unit 126 restricts the free movement of the sausage-shaped products S. Preventing unit 126 is a separate component which can be attached to gripping unit 126. That means, preventing unit can be separately manufactured and can be attached later to the robotic device 120. Furthermore, preventing unit 126 can be adapted to different kind and size of stored sausage-shaped products S.

The preventing unit 162 comprises a first preventing element 164 which has a back wall 166 and two side walls 168. Back wall 166 is substantially plat-like and extends essentially over the entire length of transverse beam 132. Attached to the respective end of back wall 166 are side walls 168 which are plat-like as well. The dimensions of first preventing element 164, i.e. the height of back wall 166 and side walls 168 as well as the length of side walls 168, are adaptable to kind and size of gripped sausages S. First preventing element 164 is releasably fixed to gripping unit 126. Side walls 168 of first preventing element 164 prevents that sausages S tilt out when robotic device 120 is moved. Back wall 166 serves for a support of sausages S when gripping unit 126 is tilted.

Furthermore, preventing unit 162 comprises a second preventing element 170 which is substantially comb-like with several teeth 172 being parallel to each other and fixed to gripping unit 126 in such a way that teeth 172 are parallel to bars 134 and rails 152 and perpendicular to gripped smoking rods R. Besides, second preventing element 170 is fixed in such a way that teeth 172 lie beneath bars 134 and rails 152 (see FIG. 10). Then, teeth 172 engage loops of sausage-shaped products S. Second preventing element 170 is height adjustable to be adaptable to different kind and size of gripped sausages S. Teeth 172 are circular (shown in cross-section) and have a tapered head 174 to simplify the thread of sausages S. Second preventing element 170 prevents a shifting of the sausages S stored on the smoking rods R.

In the following, the method for transporting, removing or inserting smoking rods R from or into a storage frame 30 or from an automatic hanging line 16 is described.

For removing smoking rods R from production line 10 into storage frame 30, robotic device 120 is positioned in front of production line 10, in particular in front of automatic line 16, or release line 70, gripping unit 126 in its opened position being positioned beneath smoking rods R being located in a predefined distance from each other on a second transfer point between production line 10 and robotic device 120. The predefined distance in which the smoking rods R are spaced apart from each other corresponds to the distances of seats 136 of gripping unit 126.

Robotic arms 124, 125 with gripping unit 126 are lifted such that rod-like elements R lie in the respective seats 136. Afterwards, rails 152 are moved by drive 156 towards rod-like elements R such that pushing elements 160 of clamping elements 158 engage the respective smoking bar R and smoking bars R are securely gripped.

Then, gripping unit 126 is lifted with smoking rods R and, additionally, gripping unit 126 can be tilted such that sausages S stored onto smoking rod R being positioned closer to transverse beam 132 than the second smoking rod R abut on first preventing element 164.

Afterwards, robotic device 122 is moved to storage frame 30, smoking rods R are tilted back such that bars 134 and rails 152 are substantially parallel to tray rails 32 of storage frame 30. Gripping unit 126 is linearly moved into storage frame 30 and lowered until smoking rods R lie onto respective tray rail 32. Then, robotic device 120 can be positioned once more in front of production line 10 to grip another rod-like elements R.

In moving robotic device 122, the preventing unit 162 prevents an uncontrolled movement of the sausage products S in engaging the sausages S and especially restricts the free movement of the sausages S.

Instead of two seats on each bar, each bar can have only one seat for gripping a smoking rod.

The invention claimed is:

1. A method for transporting, removing or inserting longitudinal rod-like elements in a handling system comprising a robotic device and a production line for producing sausage-shaped products, in particular sausages, wherein the rod-like elements, in particular smoking rods, have a central axis, a first end and a second end and serve for storing the sausage-shaped products produced in the production line, wherein two substantially parallel guidances are provided each having a first end and a second end, wherein the rod-like elements are guided along the guidances, wherein, in the area of the first end of the guidances, a first transfer point between the production line and the guidances is defined and wherein, in the area of the second end of the guidances, a second transfer point between the guidances and the robotic device is defined, the method comprising the step of:
    moving at least one rod-like element from the first transfer point to the second transfer point for the robotic device along the two guidances, and
    aligning the rod-like element in the area of the second transfer point such that the rod-like element is in a predefined position.

2. The method according to claim 1,
    wherein the rod-like element is aligned by pushing it along its central axis by means of an alignment unit.

3. A handling system for transporting, removing or inserting longitudinal rod-like elements, the handling system comprising:
    a robotic device and a production line for producing sausage-shaped products, in particular sausages, wherein the rod-like elements, in particular smoking rods, have a central axis, a first end and a second end and serve for storing sausage-shaped products, in particular sausages,
    two substantially parallel guidances each having a first end and a second end, wherein the rod-like elements are guided along the guidances, wherein, in the area of the first end of the guidances, a first transfer point between the production line and the guidances is defined and wherein, in the area of the second end of the guidances, a second transfer point between the guidances and the robotic device is defined, and
    at least one alignment unit for aligning the rod-like element in a predefined position is provided in the area of the second transfer point.

4. The handling system according to claim 3 further comprising, a holding device for a temporarily fixing of the rod-like element in the area of the second transfer point for the robotic device.

5. The handling system according to claim 3,
    wherein the alignment unit comprises a pushing element for pushing the rod-like element along its central axis such that the rod-like element is in the predefined position.

6. The handling system according to claim 5,
    wherein the alignment unit is part of a gripping carriage, the gripping carriage engaging the rod-like element and moving the rod-like element along the guidances.

7. A handling system for transporting longitudinal rod-like elements from a production line to a robotic device, the handling system comprising:
    the robotic device and the production line for producing sausage-shaped products, in particular sausages, wherein the rod-like elements, in particular smoking rods, have a central axis, a first end and a second end and serve for storing sausage-shaped products,
    two substantially parallel guidances each having a first end and a second end, wherein the rod-like elements are guided along the guidances, wherein, in the area of the first end of the guidances, a first transfer point between the production line and the guidances is defined and wherein, in the area of the second end of the guidances, a second transfer point between the guidances and the robotic device is defined, and
    at least one gripping carriage for releasably gripping at least one rod-like element, wherein the gripping carriage is linearly movable.

8. The handling system according to claim 7,
    wherein the gripping carriage comprises an engaging part with a recess for accommodating the rod-like element.

9. The handling system according to claim 8,
    wherein the engaging part is vertically movable for engaging and releasing the rod-like element.

10. The handling system according to claim 7 further comprising,
    at least one slider releasably gripping the rod-like element.

11. The handling system according to claim 7, wherein the at least one carriage comprises an alignment unit aligning the rod-like element.

12. A handling system for transporting, removing or inserting rod-like elements, in particular smoking rods, from or into a storage frame, from an automatic hanging line or from a release line, the rod-like elements serving for storing sausage-shaped products, in particular sausages, each having a loop for a pendulously storage of the sausage-shaped products, the system comprising:
    a robotic device comprising a robotic arm, and
    a gripping unit for reversibly gripping the rod-like elements, wherein the gripping unit is attached to the robotic arm of the robotic device and further comprises at least one bar with at least one seat for receiving the rod-like element, and at least one clamping element being linearly movable to clamp the received rod-like element in the seat, wherein the movement is substantially parallel to the bar.

13. The handling system according to claim 12,
wherein the bar of the gripping unit further comprises two seats for receiving two rod-like elements.

14. A method for transporting, removing or inserting rod-like elements from or into a storage frame or from an automatic hanging line or from a release line having a robotic device used in a handling system, comprising the following steps:
- positioning the robotic device with the gripping unit such that the rod-like element lies in the seat of the gripping unit,
- linearly moving the clamping element such that it engages the rod-like element, and
- removing the rod-like element from the storage frame, from the automatic hanging line or from the release line.

* * * * *